United States Patent
Andersen et al.

(10) Patent No.: US 9,934,487 B2
(45) Date of Patent: *Apr. 3, 2018

(54) CUSTODIAN MANAGEMENT SYSTEM

(75) Inventors: David M. Andersen, Charlotte, NC (US); Emerson D. Miller, Charlotte, NC (US); Michael J. Mayer, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 493 days.

This patent is subject to a terminal disclaimer.

(21) Appl. No.: 13/566,712

(22) Filed: Aug. 3, 2012

(65) Prior Publication Data

US 2013/0013768 A1 Jan. 10, 2013

Related U.S. Application Data

(62) Division of application No. 12/730,848, filed on Mar. 24, 2010, now Pat. No. 9,721,227.

(Continued)

(51) Int. Cl.
*G06Q 50/00* (2012.01)
*G06Q 10/10* (2012.01)
(Continued)

(52) U.S. Cl.
CPC .............. *G06Q 10/10* (2013.01); *G06Q 10/06* (2013.01); *G06Q 10/105* (2013.01); *G06Q 50/18* (2013.01)

(58) Field of Classification Search
CPC ................................ G06Q 10/00; G06Q 50/18
(Continued)

(56) References Cited

U.S. PATENT DOCUMENTS 5,497,317 A 3/1996 Hawkins et al.
6,119,137 A 9/2000 Smith et al.
(Continued)

FOREIGN PATENT DOCUMENTS

EP 1093068 A2 4/2001
EP 1349089 A2 1/2003
(Continued)

OTHER PUBLICATIONS

Austrian Patent Office under private law. Singapore Examination Report dated Apr. 17, 2015. Singapore Application No. 2013046917. Name of Applicant: Bank of America Corporation. English Language. 10 pages.

(Continued)

*Primary Examiner* — Johnna R Loftis
(74) *Attorney, Agent, or Firm* — Michael A. Springs; Moore & Van Allen PLLC; James C. Edwards

(57) ABSTRACT

Embodiments of the invention relate to systems, methods, and computer program products for the management of custodians within an electronic discovery system. Embodiments of the invention herein disclosed provide for methods of creating, maintaining, and utilizing a unified custodian directory for the purposes of carrying out electronic discovery within an enterprise environment. By employing a unified custodian directory to manage custodians apart from the electronic discovery cases to which they relate, the custodian management system of the present invention promotes efficiencies in the field of electronic discovery.

20 Claims, 10 Drawing Sheets

Related U.S. Application Data

(60) Provisional application No. 61/164,276, filed on Mar. 27, 2009.

(51) Int. Cl.
  *G06Q 50/18* (2012.01)
  *G06Q 10/06* (2012.01)

(58) Field of Classification Search
  USPC .................................................. 705/311, 320
  See application file for complete search history.

(56) References Cited

U.S. PATENT DOCUMENTS

| | | | |
|---|---|---|---|
| 6,601,108 B1 | 7/2003 | Marmor | |
| 6,658,625 B1 | 12/2003 | Allen | |
| 6,941,361 B1 | 9/2005 | Fink et al. | |
| 7,076,543 B1 | 7/2006 | Kirti et al. | |
| 7,124,249 B1 | 10/2006 | Darcy | |
| 7,134,020 B2 | 11/2006 | Eagle et al. | |
| 7,376,969 B1 | 5/2008 | Njemanze et al. | |
| 7,451,103 B1 | 11/2008 | Boyle et al. | |
| 7,451,139 B2 | 11/2008 | Namba | |
| 7,555,482 B2 | 6/2009 | Korkus | |
| 7,765,181 B2 | 7/2010 | Thomas et al. | |
| 7,801,808 B1 | 9/2010 | Mattison et al. | |
| 7,895,229 B1 | 2/2011 | Paknad | |
| 8,073,729 B2 | 12/2011 | Kisin et al. | |
| 2002/0143794 A1 | 10/2002 | Helt | |
| 2002/0194097 A1 | 12/2002 | Reitz | |
| 2002/0198629 A1 | 12/2002 | Ellis | |
| 2003/0154199 A1* | 8/2003 | Thomas et al. | 707/10 |
| 2003/0182375 A1 | 9/2003 | Zhu et al. | |
| 2003/0200308 A1 | 10/2003 | Tameda et al. | |
| 2004/0098424 A1 | 5/2004 | Seidenberg et al. | |
| 2004/0260733 A1 | 12/2004 | Adelstein et al. | |
| 2005/0027750 A1 | 2/2005 | Martin et al. | |
| 2005/0086720 A1 | 4/2005 | Shimizu et al. | |
| 2005/0114290 A1 | 5/2005 | Borthakur et al. | |
| 2005/0152235 A1 | 7/2005 | Hoshizawa | |
| 2005/0177527 A1 | 8/2005 | Morris et al. | |
| 2005/0216522 A1 | 9/2005 | Gomes et al. | |
| 2005/0257129 A1 | 11/2005 | Kreiner et al. | |
| 2006/0095795 A1 | 5/2006 | Nakamura et al. | |
| 2006/0167877 A1 | 7/2006 | Lee et al. | |
| 2006/0256739 A1 | 11/2006 | Seier et al. | |
| 2007/0027974 A1 | 2/2007 | Lee et al. | |
| 2007/0073894 A1 | 3/2007 | Erickson et al. | |
| 2007/0088754 A1 | 4/2007 | Brannon et al. | |
| 2007/0100978 A1 | 5/2007 | Levi et al. | |
| 2007/0112783 A1 | 5/2007 | McCreight et al. | |
| 2007/0162547 A1 | 7/2007 | Ross | |
| 2007/0203837 A1 | 8/2007 | DiRienzo | |
| 2007/0208918 A1 | 9/2007 | Harbin et al. | |
| 2007/0226170 A1 | 9/2007 | Sun | |
| 2007/0271517 A1* | 11/2007 | Finkelman et al. | 715/742 |
| 2007/0288579 A1 | 12/2007 | Schunemann | |
| 2008/0027895 A1 | 1/2008 | Combaz | |
| 2008/0046260 A1 | 2/2008 | Ghielmetti et al. | |
| 2008/0059502 A1* | 3/2008 | Kobayashi | G01C 21/32 |
| 2008/0061146 A1 | 3/2008 | Komaki | |
| 2008/0082672 A1 | 4/2008 | Garrett | |
| 2008/0162455 A1 | 7/2008 | Daga et al. | |
| 2008/0168145 A1 | 7/2008 | Wilson | |
| 2008/0252936 A1 | 10/2008 | Stratton | |
| 2008/0288479 A1 | 11/2008 | Paknad et al. | |
| 2008/0294492 A1 | 11/2008 | Simpson et al. | |
| 2009/0001162 A1 | 1/2009 | Asher et al. | |
| 2009/0006973 A1 | 1/2009 | Newell et al. | |
| 2009/0043819 A1 | 2/2009 | Searl et al. | |
| 2009/0076836 A1 | 3/2009 | Arvidson et al. | |
| 2009/0132262 A1 | 5/2009 | Paknad | |
| 2009/0157759 A1 | 6/2009 | Kunisaki et al. | |
| 2009/0164427 A1 | 6/2009 | Shields et al. | |
| 2009/0164522 A1 | 6/2009 | Fahey | |
| 2009/0165026 A1 | 6/2009 | Paknad et al. | |
| 2009/0183253 A1 | 7/2009 | Kates | |
| 2009/0193210 A1 | 7/2009 | Hewett et al. | |
| 2009/0210494 A1 | 8/2009 | Fisher et al. | |
| 2009/0286219 A1 | 11/2009 | Kisin et al. | |
| 2009/0313196 A1 | 12/2009 | Islam et al. | |
| 2010/0017239 A1 | 1/2010 | Saltzman et al. | |
| 2010/0030798 A1 | 2/2010 | Kumar et al. | |
| 2010/0033750 A1 | 2/2010 | Tischler et al. | |
| 2010/0082382 A1 | 4/2010 | Kisin et al. | |
| 2010/0082555 A1 | 4/2010 | Ogawa et al. | |
| 2010/0185875 A1 | 7/2010 | Mayer et al. | |
| 2010/0205020 A1 | 8/2010 | Losey | |
| 2010/0223108 A1 | 9/2010 | Quinn, Jr. | |
| 2010/0250266 A1 | 9/2010 | Miller et al. | |
| 2010/0250308 A1 | 9/2010 | Mayer et al. | |
| 2010/0250455 A1 | 9/2010 | Richards et al. | |
| 2010/0250456 A1 | 9/2010 | Toomey et al. | |
| 2010/0250459 A1 | 9/2010 | Andersen et al. | |
| 2010/0250474 A1 | 9/2010 | Richards et al. | |
| 2010/0250484 A1 | 9/2010 | Andersen et al. | |
| 2010/0250488 A1 | 9/2010 | Mayer et al. | |
| 2010/0250498 A1 | 9/2010 | Andersen et al. | |
| 2010/0250503 A1 | 9/2010 | Andersen et al. | |
| 2010/0250509 A1 | 9/2010 | Andersen | |
| 2010/0250512 A1 | 9/2010 | Miller et al. | |
| 2010/0250531 A1 | 9/2010 | Andersen et al. | |
| 2010/0250538 A1 | 9/2010 | Richards et al. | |
| 2010/0250541 A1 | 9/2010 | Richards et al. | |
| 2010/0250573 A1 | 9/2010 | Mayer et al. | |
| 2010/0250644 A1 | 9/2010 | Toomey et al. | |
| 2010/0250735 A1 | 9/2010 | Andersen | |
| 2010/0250931 A1 | 9/2010 | Andersen et al. | |
| 2010/0251149 A1 | 9/2010 | Mayer et al. | |
| 2010/0306283 A1 | 12/2010 | Johnson et al. | |
| 2011/0016138 A1 | 1/2011 | Teerlink | |
| 2011/0040600 A1 | 2/2011 | Paknad et al. | |
| 2011/0173033 A1 | 7/2011 | Paknad et al. | |
| 2012/0191500 A1 | 7/2012 | Byrnes et al. | |

FOREIGN PATENT DOCUMENTS

| | | |
|---|---|---|
| WO | WO 01/27765 A1 | 4/2001 |
| WO | WO 2002010967 A2 | 2/2002 |
| WO | WO 02/42952 A1 | 5/2002 |
| WO | WO 02/42952 A1 | 5/2002 |
| WO | WO 20020071192 A2 | 9/2002 |
| WO | WO 03/065256 A1 | 8/2003 |
| WO | WO 2004/092902 | 10/2004 |
| WO | WO 2004/092902 A2 | 10/2004 |
| WO | WO 2006001833 A2 | 1/2006 |
| WO | WO 2006/031836 A2 | 3/2006 |
| WO | WO 2006031836 A2 | 3/2006 |
| WO | WO 2006052441 A2 | 5/2006 |
| WO | WO 2007/044709 A2 | 4/2007 |
| WO | WO 20071044709 | 4/2007 |
| WO | WO 2007/076515 | 7/2007 |
| WO | WO 2007076515 A2 | 7/2007 |
| WO | WO 2008009991 A1 | 1/2008 |
| WO | WO 2008/070415 A2 | 6/2008 |
| WO | WO 2008070415 A2 | 6/2008 |

OTHER PUBLICATIONS

Microsoft Corporation: "Developing Efficient Background Processes for Windows"; Jan. 20, 2009; URL; Jan. 20, 2009; URL:http://msdn.microsoft.com/en-us/library/windows/hardware/gg463211.aspx.

Extended European Search Report dated Sep. 23, 2010, for European Application No. EP 10 250 587.

European Patent Office. European Office Action dated Apr. 26, 2012. European Application No. EP 10 250 583.1. Name of Applicant: Bank of America Corporation. English Language. 10 pages.

Examination Report for European Application No. EP 10 250 588.0 dated Jun. 27, 2012.

Stamerjohanns et al, "Transforming the arxiv to XML", 2008.

(56) References Cited

OTHER PUBLICATIONS

Summons and Oral Proceedings issued in EP10250584.9, dated Jul. 29, 2013.
Summons and Oral Proceedings issued in EP10250591.4, dated Jul. 30, 2013.
Summons and Oral Proceedings issued in EP10250586.4, dated Jul. 30, 2013.
Summons and Oral Proceedings issued in EP10250590.6, dated Jul. 30, 2013.
Search and Examination Report issued in SG 018989, dated Jul. 17, 2013.
Summons and Oral Proceedings issued in EP10250583.1, dated Jul. 24, 2013.
Summons and Oral Proceedings issued in EP10250589.8, dated Jul. 24, 2013.
Summons and Oral Proceedings issued in EP10250577.3, dated Jul. 22, 2013.
Summons and Oral Proceedings issued in EP10250580.7, dated Jul. 22, 2013.
Summons and Oral Proceedings issued in EP10250582.3, dated Jul. 22, 2013.
Summons and Oral Proceedings issued in EP10250578.1, dated Jul. 22, 2013.
Summons and Oral Proceedings issued in EP10250576.5, dated Jul. 22, 2013.
Summons and Oral Proceedings issued in EP10250585.6, dated Jul. 25, 2013.
Summons and Oral Proceedings issued in EP10250579.9, dated Jul. 25, 2013.
Summons and Oral Proceedings issued in EP10250581.5, dated Jul. 25, 2013.
Summons and Oral Proceedings issued in EP10250588.0, dated Jul. 26, 2013.
Summons and Oral Proceedings issued in EP10250587.2, dated Jul. 26, 2013.
Austrian Patent Office. Singapore Application No. 201002120-2. Second Written Opinion dated Jul. 20, 2012. Name of Applicant: Bank of America Corporation. Filing Date: Mar. 26, 2010. English Language. 10 pages.
Austrian Patent Office. Singapore Application No. 201002141-8. Second Written Opinion dated Jul. 20, 2012. Name of Applicant: Bank of America Corporation. Filing Date: Mar. 26, 2010. English Language. 10 pages.
Singapore Search Report and Written Opinion for Application No. 2013046917 dated Nov. 5, 2014.
Utility U.S. Appl. No. 12/534,375, filed Aug. 3, 2009.
Utility U.S. Appl. No. 12/614,059, filed Nov. 6, 2009.
Utility U.S. Appl. No. 12/618,430, filed Nov. 13, 2009.
Utility U.S. Appl. No. 12/618,443, filed Nov. 13, 2009.
Utility U.S. Appl. No. 12/627,791, filed Nov. 30, 2009.
Utility U.S. Appl. No. 12/627,890, filed Nov. 30, 2009.
Utility U.S. Appl. No. 12/627,996, filed Nov. 30, 2009.
Utility U.S. Appl. No. 12/696,653, filed Jan. 29, 2010.
Utility U.S. Appl. No. 12/702,641, filed Feb. 9, 2010.
Utility U.S. Appl. No. 12/729,987, filed Mar. 23, 2010.
Utility U.S. Appl. No. 12/730,780, filed Mar. 24, 2010.
Utility U.S. Appl. No. 12/730,785, filed Mar. 24, 2010.
Utility U.S. Appl. No. 12/730,790, filed Mar. 24, 2010.
Utility U.S. Appl. No. 12/730,792, filed Mar. 24, 2010.
Utility U.S. Appl. No. 12/730,799, filed Mar. 24, 2010.
Utility U.S. Appl. No. 12/730,807, filed Mar. 24, 2010.
Utility U.S. Appl. No. 12/730,818, filed Mar. 24, 2010.
Utility U.S. Appl. No. 12/730,821, filed Mar. 24, 2010.
Utility U.S. Appl. No. 12/730,840, filed Mar. 24, 2010.
Utility U.S. Appl. No. 12/730,851, filed Mar. 24, 2010.
Utility U.S. Appl. No. 12/731,657, filed Mar. 25, 2010.
European Patent Office. European Office Action dated Apr. 25, 2012. European Application No. 10 250 578.1. Name of Applicant: Bank of America Corporation. English Language. 10 pages.
European Patent Office. European Office Action dated Apr. 25, 2012. European Application No. 10 250 591.4. Name of Applicant: Bank of America Corporation. English Language. 10 pages.
European Patent Office. European Office Action dated Apr. 26, 2012. European Application No. 10 250 585.6. Name of Applicant: Bank of America Corporation. English Language. 10 pages.
European Patent Office. European Office Action dated Apr. 26, 2012. European Application No. 10 250 589.8. Name of Applicant: Bank of America Corporation. English Language. 10 pages.
European Patent Office. European Office Action dated Apr. 26, 2012. European Application No. 10 250 579.9. Name of Applicant: Bank of America Corporation. English Language. 10 pages.
European Patent Office. European Office Action dated Apr. 26, 2012. European Application No. 10 250 584.9. Name of Applicant: Bank of America Corporation. English Language. 10 pages.
European Patent Office. European Office Action dated Apr. 25, 2012. European Application No. 10 250 586.4. Name of Applicant: Bank of America Corporation. English Language. 10 pages.
European Patent Office. European Office Action dated Apr. 25, 2012. European Application No. 10 250 581.5. Name of Applicant: Bank of America Corporation. English Language. 10 pages.
European Patent Office. European Office Action dated Apr. 25, 2012. European Application No. 10 250 576.5. Name of Applicant: Bank of America Corporation. English Language. 11 pages.
European Patent Office. European Office Action dated Apr. 27, 2012. European Application No. 10 250 587.2. Name of Applicant: Bank of America Corporation. English Language. 10 pages.
European Patent Office. European Office Action dated Apr. 25, 2012. European Application No. 10 250 577.3. Name of Applicant: Bank of America Corporation. English Language. 10 pages.
European Patent Office. European Office Action dated Apr. 25, 2012. European Application No. 10 250 580.7, Name of Applicant: Bank of America Corporation. English Language. 10 pages.
European Patent Office. European Office Action dated Apr. 25, 2012. European Application No. 10 250 590.6. Name of Applicant: Bank of America Corporation. English Language. 10 pages.
European Patent Office. European Office Action dated Apr. 26, 2012. European Application No. 10 250 582.3. Name of Applicant: Bank of America Corporation. English Language. 10 pages.
Great Britain Intellectual Property Office. GB Examination Report dated Apr. 23, 2012. Great Britain Application No. GB1108090.0. Name of Applicant: Bank of America Corporation. English Language. 3 pages.
Hewlett Packard. "*HP OpenView Storage Data Protector Concepts Guide.*" Release A.06.00. Manufacturing part No. B6960-96001. English Language. Jul. 2006.
Hungarian Intellectual Property Office. Written Opinion dated Apr. 5, 2012. Hungary Application No. 201002137-6. Name of Applicant: Ban k of America Corporation. English Language. 8 pages. Date of Written Opinion: Mar. 21, 2012.
Hungarian Intellectual Property Office. Written Opinion dated Apr. 5, 2012. Hungary Application No. 201002138-4. Name of Applicant: Ban k of America Corporation. English Language. 8 pages. Date of Written Opinion: Mar. 29, 2012.
Danish Patent and Trademark Office. Singapore Examination Report dated Mar. 15, 2012. Applicant: Bank of America Corporation. Singapore Patent Application No. 201002134-3. DKPTO SE No. SE 2012 00392v. English Language. 10 pages. Date of Examination Report: Mar. 12, 2012.
Danish Patent and Trademark Office. Singapore Examination Report dated Mar. 15, 2012. Applicant: Bank of America Corporation. Singapore Patent Application No. 201002124-4. DKPTO SE No. SE 2012 00392y. English Language. 10 pages. Date of Examination Report: Mar. 12, 2012.
SysTools Software, "Export Notes—Notes Email Migration Tool", 2008, available online: http://web.archive.org/web/20080201104418/http://www.exportlotusnotes.com/export-notes.
Process Text Group, "ABC Amber BlackBeny Converter", 2008, available online: http:web.archive.org/web/20080302025411/http://www.processtext.com/abcblackberry.html.
Search Report and Written Opinion for Singapore Application No. 201002122-8 dated Jan. 3, 2012.

(56) References Cited

OTHER PUBLICATIONS

Search Report and Written Opinion for Singapore Application No. 201002141-8 dated Jan. 3, 2012.
Search Report and Written Opinion for Singapore Application No. 201002143-4 dated Jan. 3, 2012.
Search Report and Written Opinion for Singapore Application No. 201002120-2 dated Feb. 10, 2012.
Second Written Opinion for Singapore Application No. 201002126-9 dated Mar. 14, 2012.
Second Written Opinion for Singapore Application No. 201002128-5 dated Mar. 14, 2012.
Second Written Opinion for Singapore Application No. 201002129-3 dated Mar. 14, 2012.
Second Written Opinion for Singapore Application No. 201002139-2 dated Mar. 14, 2012.
Singapore Patent Application No. 201002142-6 Search Report and Written Opinion dated Sep. 5, 2011.
Singapore Patent Application No. 201002144-2 Search Report and Written Opinion dated Sep. 5, 2011.
Singapore Patent Application No. 201002140-0 Search Report and Written Opinion dated Sep. 27, 2011.
Ciravegna et al.: "User-System Cooperation in Document Annotation based on Information Extraction" 2002. Proceedings of the 13th International Conference on Knowledge Engineering and Knowledge Management.
Buchholz et al.: "On the Role of File System Metadata in Digital Forensics", Journal of Digital Investigation, vol. 1(4), pp. 297-308, Dec. 1, 2004.
Golden et al. Scalpel: "A Frugal, High Performance File Carver" 2005 Digital Forensic Research Workshop (DFRWS) New Orleans, LA.
Manson et al.: "Is the Open Way a Better Way? Digital Forensics using Open Source Tools". System Sciences, 2007. HICSS 2007. 40th Annual Hawaii International Conference on, IEEE, PI, Jan. 1, 2007. ISBN:978-0-7695-2755-0.
Berinato: "The Rise of Anti-Forensics" http/www.csoonline.com/article/print/221208. Jun. 8, 2007.
Anonymous: "EDRM LegalTech 2009 Luncheon Presentation" E.D.R.M. The Electronic Discovery Reference Model Feb. 9, 2009. Retrieved from the Internet: http://www.edrm.net/wp-content/plugins/download-monitor/download.php? id=6.
Singapore Patent Application No. 201002126-9 Search Report and Written Opinion dated Aug. 3, 2011.
Singapore Patent Application No. 201002129-3 Search Report and Written Opinion dated Aug. 3, 2011.
Singapore Patent Application No. 201002128-5 Search Report and Written Opinion dated Aug. 3, 2011.
Singapore Patent Application No. 201002139-2 Search Report and Written Opinion dated Aug. 3, 2011.
Singapore Patent Application No. 201002137-6 Search Report and Written Opinion dated Aug. 15, 2011.
Singapore Patent Application No. 201002138-4 Search Report and Written Opinion dated Aug. 19, 2011.
Singapore Patent Application No. 201002125-1 Search Report and Written Opinion dated Aug. 24, 2011.
Singapore Patent Application No. 201002134-3 Search Report and Written Opinion dated Aug. 25, 2011.
Singapore Patent Application No. 201002124-4 Search Report and Written Opinion dated Aug. 25, 2011.
J. Barlow, L. Bean and D.D. Hott: "Employee 'Spy' Software: Should You Use It?" The Journal of Corporate Accounting & Finance, Document No. XP-002601405, pp. 7-12; Retrieved from the Internet. I JRT ,. httmllonlinelibran, wilev com/101002Jicaf 10162/abstract [retrieved on Sep. 17, 2010].
Dan Manson et al.: "Is the Open Way a Better Way? Digital Forensics using Open Source Tools", Proceedings of the 40th Hawaii International Conference on System Sciences—2007 [dated Jan. 1, 2007]; 10 Doges total.
Anonymous: "EDRM LegalTech 2009 Luncheon Presentation", E.D.R.M.—The Electronic Discovery Reference Model; Document No. XP-002601404 LegalTech Lunch & Learn, Feb. 3, 2009.
Extended European Search Report dated Sep. 22, 2010 for European Application No. EP 10 25 0585.
Austrian Patent Office. Singapore Application No. 201002144-2. Second Written Opinion dated Aug. 6, 2012. Name of Applicant: Bank of America Corporation. Filing Date: Mar. 26, 2010. English Language. 8 pages.
Austrian Patent Office. Singapore Application No. 201002140-0. Second Written Opinion dated Aug. 6, 2012. Name of Applicant: Bank of America Corporation. Filing Date: Mar. 26, 2010. English Language. 8 pages.

\* cited by examiner

CUSTODIAN MANAGEMENT SYSTEM

CROSS-REFERENCE TO RELATED APPLICATION

This application is a Divisional application of U.S. patent application Ser. No. 12/730,848 filed on Mar. 24, 2010, the disclosure of which is hereby incorporated by reference herein for all purposes.

CLAIM OF PRIORITY UNDER 35 U.S.C. § 119

The present Application for Patent claims priority to Provisional Application No. 61/164,276 entitled "Electronic Discovery System" filed Mar. 27, 2009, and assigned to the assignee hereof and hereby expressly incorporated by reference herein.

FIELD

In general, embodiments of the invention relate to methods, systems and computer program products for the management of custodians within an electronic discovery system.

BACKGROUND

Electronic discovery, commonly referred to as e-discovery, refers to any process in which electronic data is sought, located, secured and searched with the intent of using it as evidence in a legal proceeding, an audit, a securities investigation, a forensics investigation or the like. E-discovery can be carried out offline on a particular computer or it can be accomplished in a network environment.

The nature of digital data makes it extremely well-suited for investigation. In particular, digital data can be electronically searched with ease, while paper documents must be scrutinized manually. Furthermore, it is difficult or impossible to completely destroy digital data, particularly if the data is stored in a network environment. This is because the data appears on multiple hard drives, and because digital files, even if deleted, generally can be undeleted. In fact, the only reliable means of destroying digital data is to physically destroy any and all hard drives where it is stored.

In the process of electronic discovery, data of all types can serve as evidence. This can include text, image, calendar event data, databases, spreadsheets, audio files, multimedia files, web sites and computer programs. Electronic mail (i.e., e-mail) can be an especially valuable source of evidence in civil or criminal litigation, because people are often less careful in these exchanges than in hard copy correspondence such as written memos or postal letters.

E-discovery is an evolving field that goes far beyond mere technology. It gives rise to multiple issues, many of which have yet to be resolved. For example, identifying data required to satisfy a given discovery request, locating the appropriate set of data that has been identified, and retrieving the data once it has been identified and located all pose problems in and of themselves. This is especially evident if the data that is being identified, located and retrieved comes from an evolving or disparate enterprise, such as a corporation that has experienced mergers, acquisitions, downsizing and the like. Mergers and acquisitions mean that the technology infrastructure across the enterprise may vary, at least in the interim. However, e-discovery must be able locate and retrieve data from these disparate technology infrastructure in a timely fashion, sometimes within days of when the merger/acquisition occurs.

In addition to identifying, locating and retrieving digital data, the most critical part of any electronic discovery is the preservation of data, which involves maintaining an original source copy and storing it for preservation purposes or furthering processing. This too becomes a daunting task for the enterprise system that encompasses a myriad of different technology infrastructures and the like. Therefore, a need exists to improve the identification, location, retrieval and preservation processes, especially in instances in which the enterprise system includes disparate technology infrastructures and the like.

As previously noted, e-discovery, as opposed as conventional discovery of printed materials, provides for the ability to filter or search the data so as to reduce the volume of data to only that which is relevant to the request. Such searching is typically accomplished by determining a specific date range for the request, providing key words relevant to the case and the like. Improvements in the area of searching are greatly in need to further add efficiency to the overall e-discovery process.

Once data has been retrieved, preserved and, in some instances, searched the electronic data may be reviewed by the requesting entity, such as a law firm, securities commission or the like. While large requests are generally suited for online review, the manner in which the data is presented for review adds efficiency to the review process and ultimately drives the cost of the review process. Therefore, improvements in the manner in which data is presented for review are also desirable as a means of increasing efficiency and reducing costs.

Lastly, once the digital data has been reviewed, data identified as relevant may need to be produced in a tangible format for further analysis or legal evidentiary purposes. The produced documents must be properly identified and include necessary redactions and confidentiality markings.

Until now, e-discovery management has been conducted on a case-by-case basis, meaning all tasking and workflow related to the e-discovery is based at the case level. Such management does not allow for finer granularity in the management of a case or for links to exist between different cases for the purpose of leveraging the e-discovery related to one case to another new or pre-existing case. Therefore, a need exists to improve the manner in which cases are managed and, in particular, how tasking and workflow are managed depending on case requirements and the like.

SUMMARY

Embodiments of the invention relate to systems, methods, and computer program products for the management of custodians and, more particularly, creating, maintaining, and utilizing a unified custodian directory for the purposes of carrying out electronic discovery within an enterprise environment. In one embodiment of the invention, a method for managing custodians for the purposes of electronic discovery within a network is provided and includes the following steps: (1) maintaining a custodian directory comprising a custodian profile associated with a custodian, wherein the custodian profile comprises information relating to a storage location in the network associated with the custodian, and (2) accessing the custodian profile to automatically collect data from the storage location via the network in response to an electronic discovery request identifying the custodian.

According to some embodiments, the custodian directory comprises a plurality of custodian profiles associated with a plurality of custodians, respectively. In some embodiments, the custodian directory comprises at least two tables within the network. In some embodiments, the tables are linked based on an identifier associated with the custodian. In some embodiments, the tables reside in different locations within the network.

In some embodiments, the custodian profile comprises human resources data associated with the custodian. In some embodiments, the custodian directory interfaces with a human resources database residing on the network. In some embodiments, the custodian directory comprises a human resources table residing on the network.

In some embodiments, the information relating to a storage location comprises an IP address. According to some embodiments, the electronic discovery request does not identify the storage location. In some embodiments, the custodian directory is configured to be updated continuously or periodically. In some embodiments, the custodian profile further comprises historical information relating to the custodian. In some embodiments, the custodian directory is searchable via a user interface. In some embodiments, the electronic discovery request identifying the custodian comprises an input through a user interface of information stored in the custodian profile.

In some embodiments, the method also includes linking the custodian profile to an electronic discovery case record. In some embodiments, the method also includes accessing the custodian profile in order to send a preservation notice to the custodian.

According to some embodiments of the present invention, a method for maintaining a custodian directory for use in conducting electronic discovery within a network is provided, wherein the method includes the following: (1) identifying a plurality of tables within the network comprising information relating to custodians, (2) linking the tables based on identifiers associated with the custodians, and (3) creating at least one custodian profile, wherein the custodian profile is associated with a custodian and comprises the information in the tables associated with the identifier associated with the custodian.

In some embodiments, the method also includes copying the tables into a database. In some embodiments, the custodian profile comprises information relating to storage locations in the network associated with the custodian. In some embodiments, the tables comprise a human resources table. In some embodiments, the custodian profile comprises human resources data relating to the custodian. In some embodiments, the tables comprise network directory information. In some embodiments, the custodian profile comprises the information for at least one related custodian.

According to some embodiments, the method also includes: recognizing changes in the information in the tables over time, and recording the changes to create a historic record of the information relating to custodians.

According to some embodiments of the present invention a custodian management system for use in conducting electronic discovery within a network is provided, wherein the system includes: a custodian directory comprising a plurality of custodian profiles relating to custodians, and an electronic discovery management server in communication with the custodian directory via the network, comprising an input device and configured to interface with a plurality of data feeds comprising information relating to the custodians to manage the custodian directory.

In some embodiments, the custodian directory comprises a plurality of tables comprising data relating to the custodians. In some embodiments, the tables are linked based on identifiers associated with the custodians. In some embodiments, the custodian profile of each custodian in the custodian directory comprises the data in the tables associated with the identifier of the custodian. In some embodiments, the electronic discovery management server is configured to, in response to a user entering via the input device information about a custodian, search the custodian directory and return the custodian profiles in the custodian directory that include that information. In some embodiments, the custodian profiles comprise information relating to storage locations in the network associated with the custodians.

In some embodiments, the electronic discovery management server is configured to initialize tools on a periodic basis to obtain the information relating to storage locations. In some embodiments, the electronic discovery management server is configured to send preservation notices to custodians using the email addresses stored in the custodian directory. In some embodiments, the custodian directory interfaces with a human resources database. In some embodiments, the custodian directory comprises a human resources database. In some embodiments, the electronic discovery management server is configured to record within the custodian profiles the changes that occur to the information in the custodian profiles over time such that the custodian profiles comprise historic information relating to the custodians.

According to some embodiments of the present invention, a computer program product for maintaining a custodian management system in for the purposes of performing electronic discovery in an enterprise environment, the computer program product comprising a computer readable medium having computer readable program instructions stored therein is provided, wherein the computer readable program instructions comprise: first instructions configured for linking multiple tables within the network comprising information relating to custodians based on identifiers associated with the custodians, and second instructions configured for creating at least one custodian profile, wherein the custodian profile is associated with a custodian and comprises the information in the tables associated with the identifier associated with the custodian.

BRIEF DESCRIPTION OF THE DRAWINGS

Figure 1:
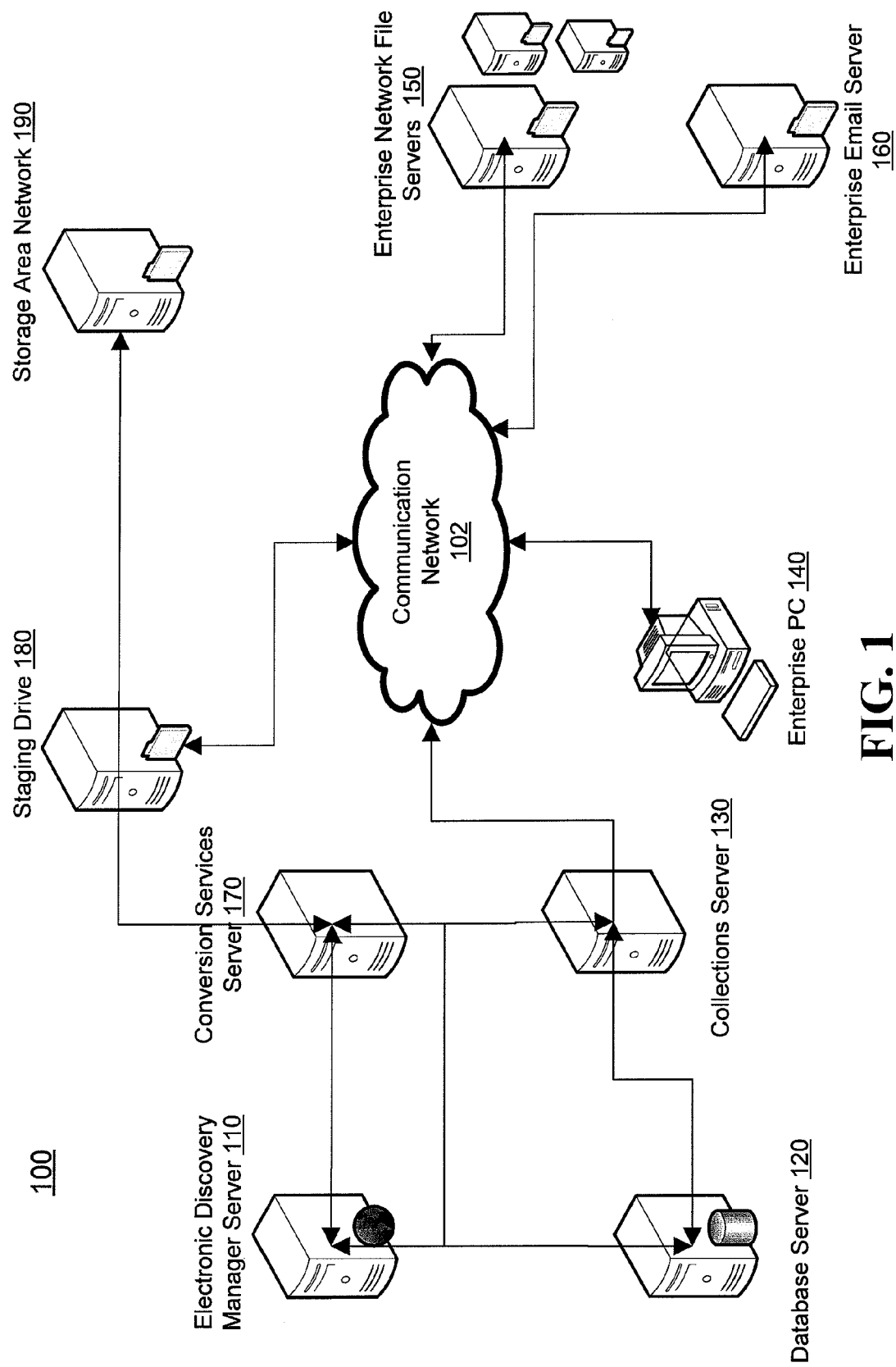
Figure 2:
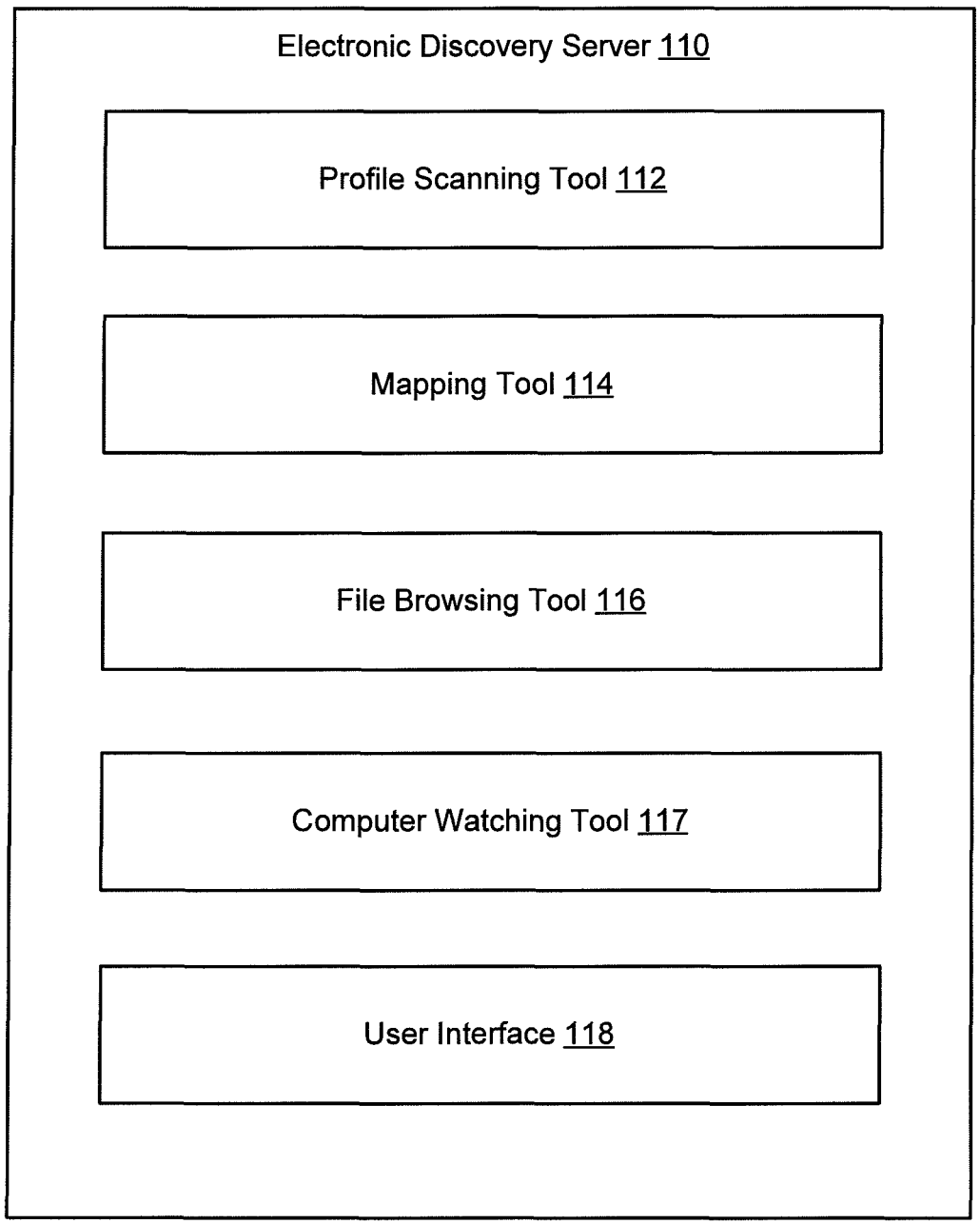
Figure 3:
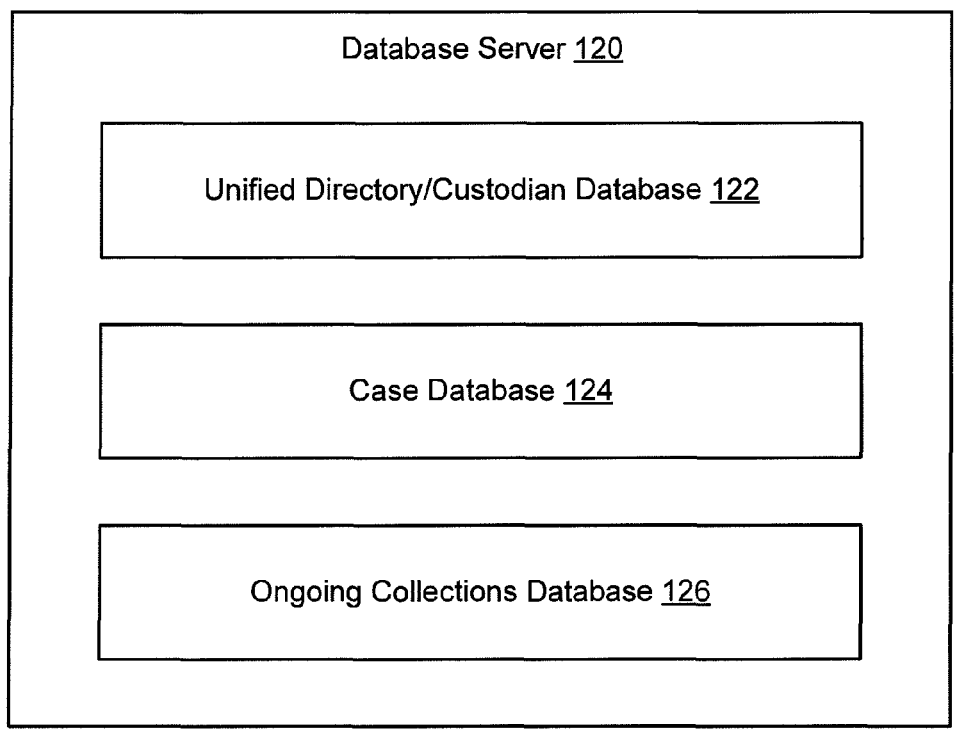
Figure 4:
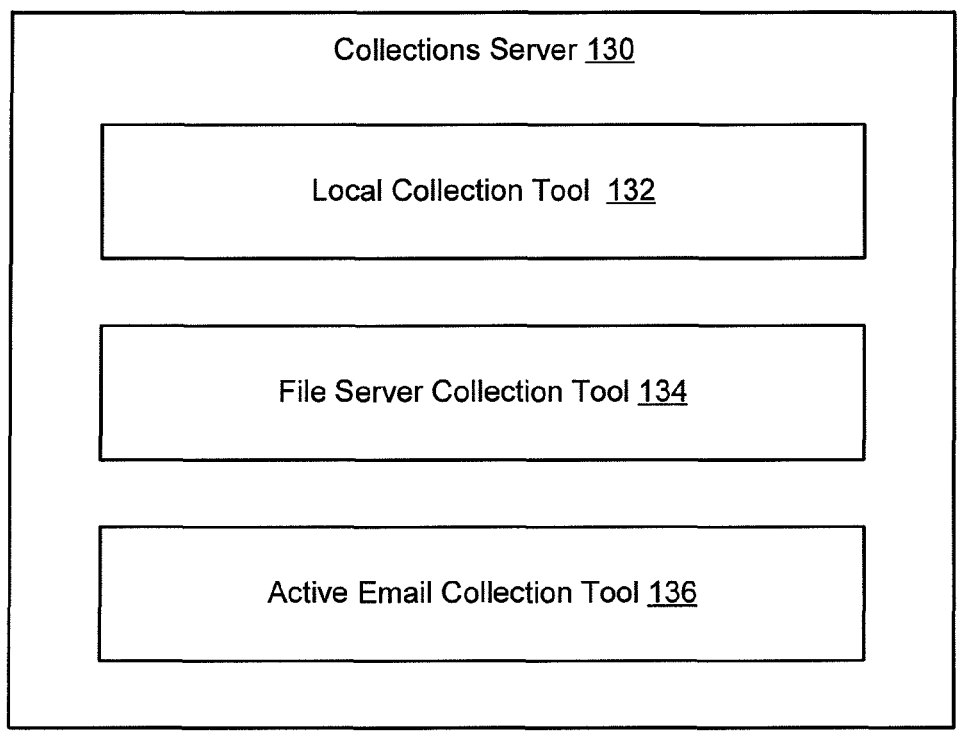
Figure 5:
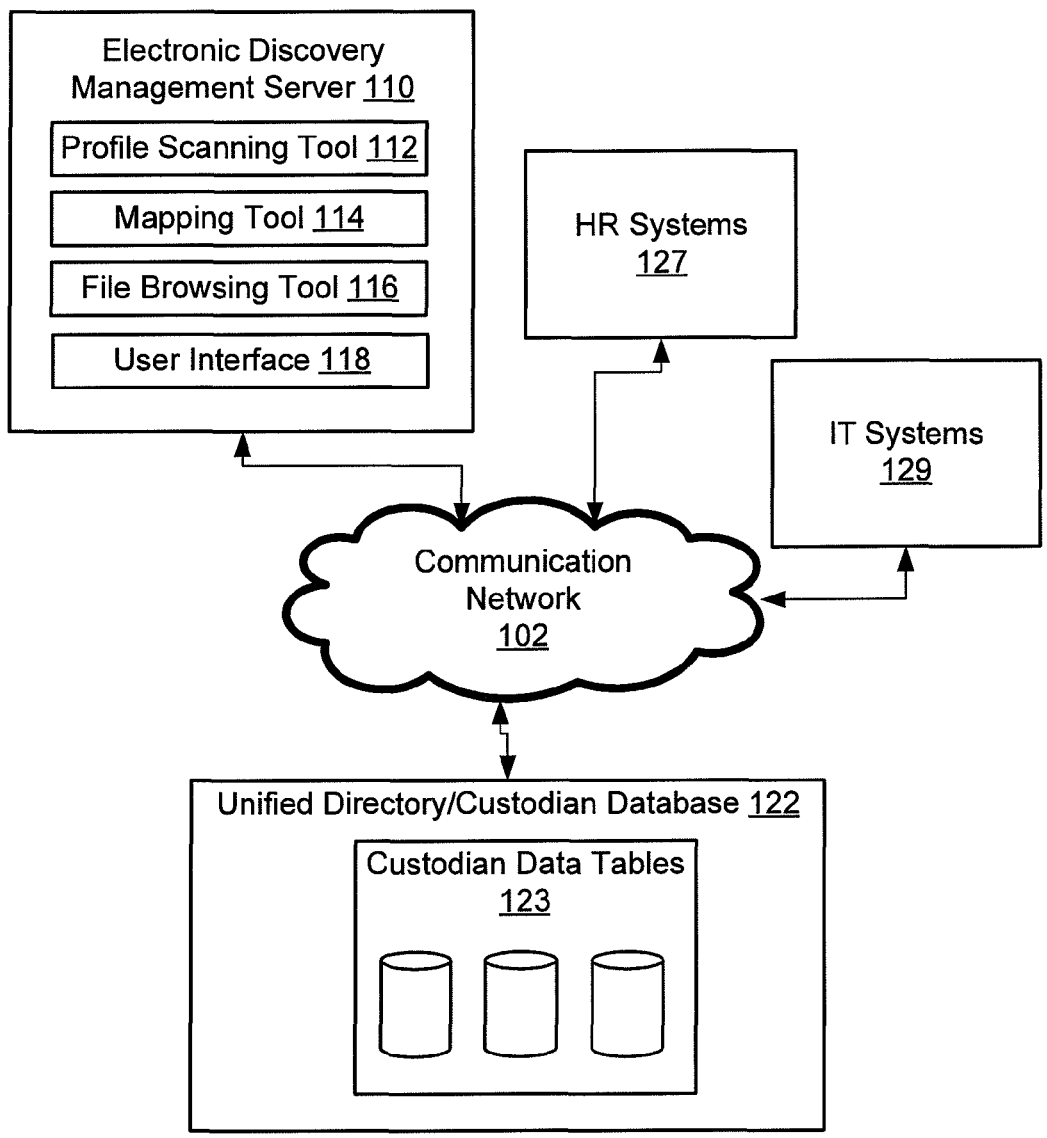
Figure 6:
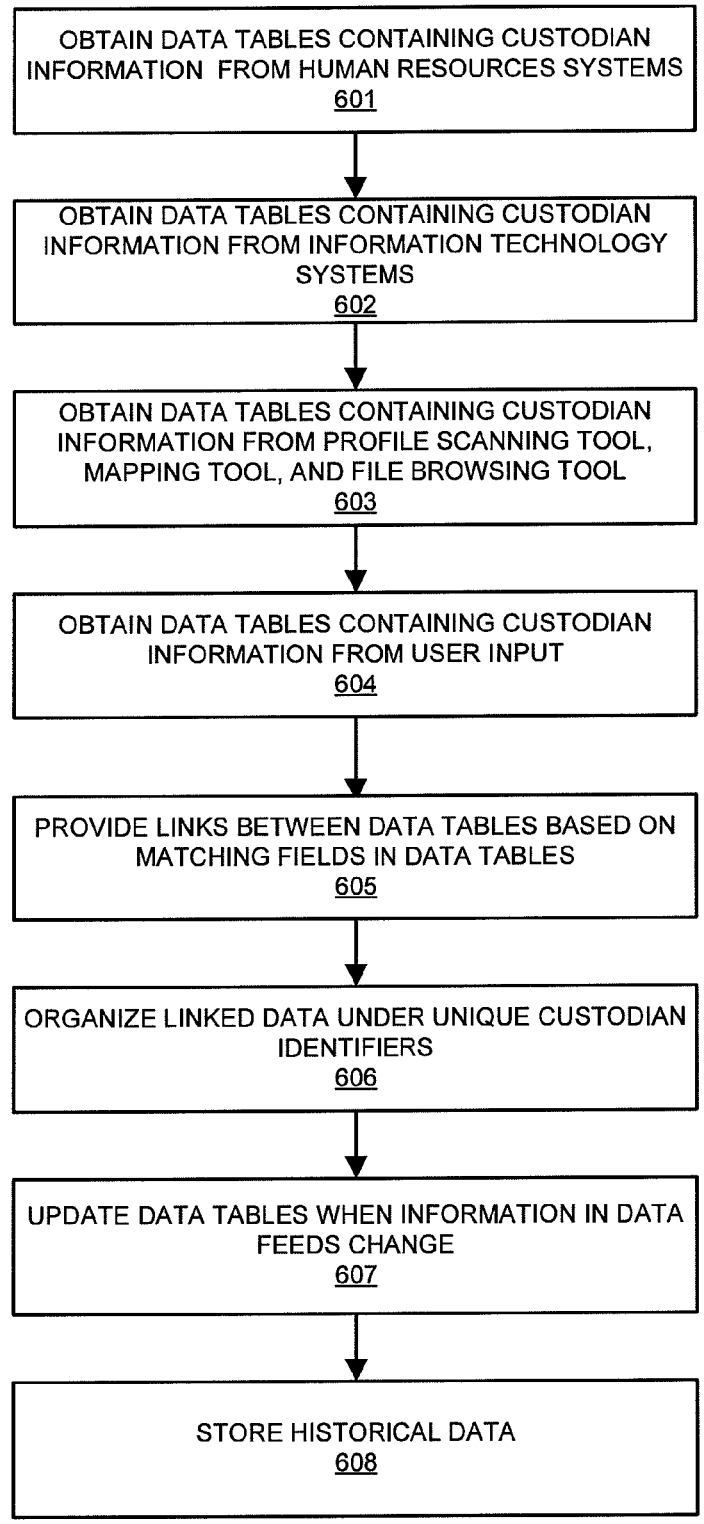
Figure 7:
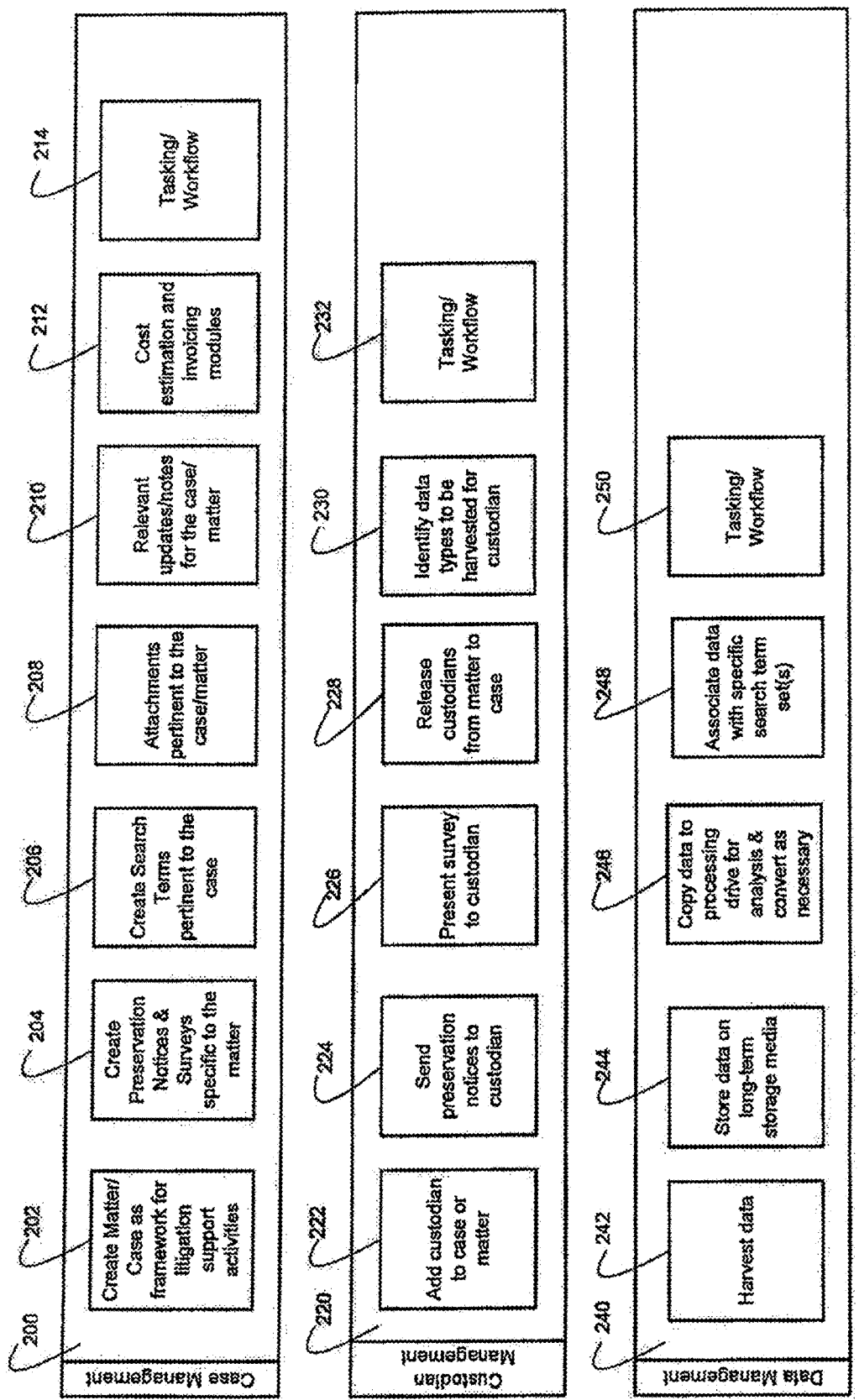
Figure 8:
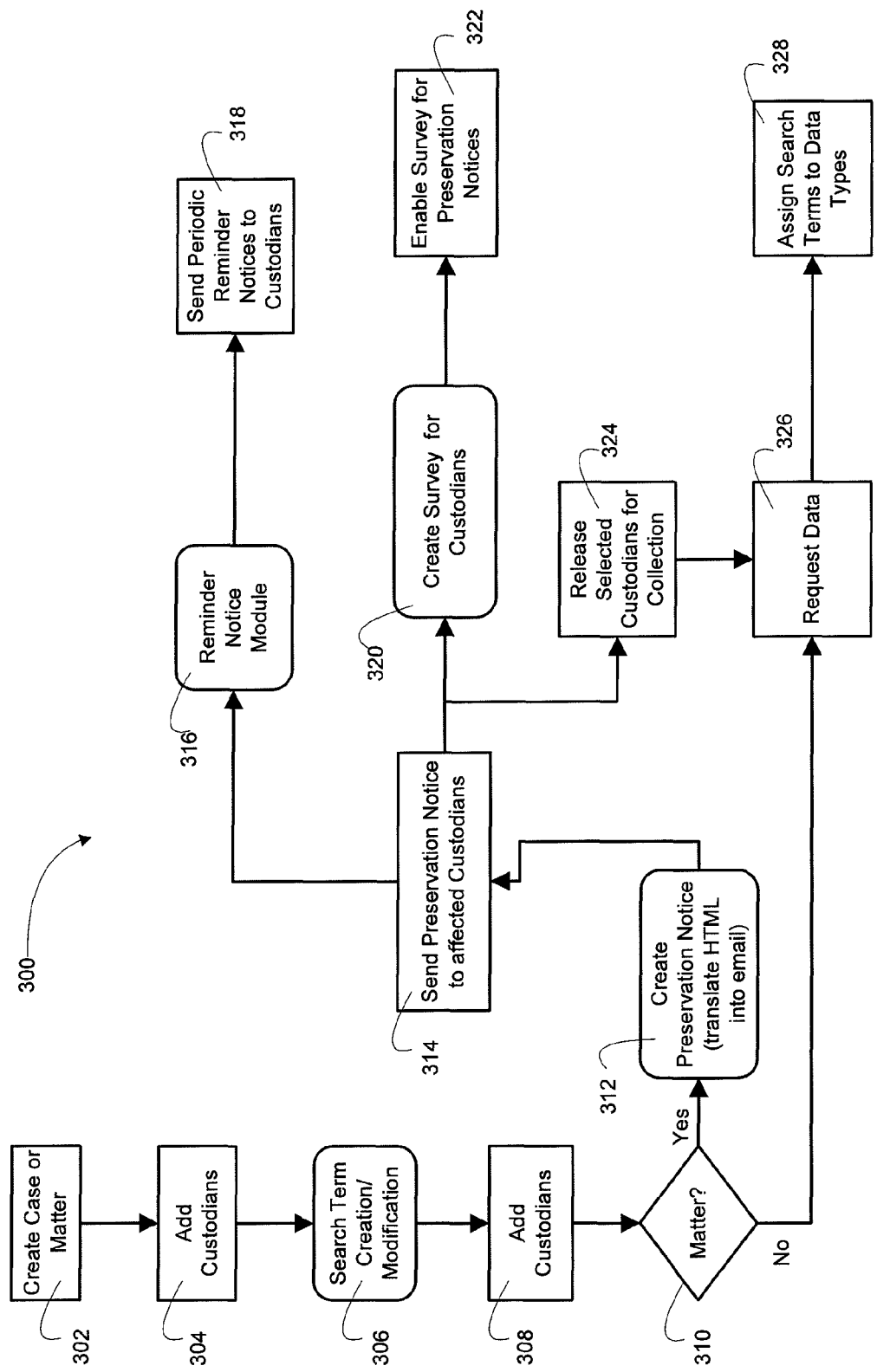
Figure 9:
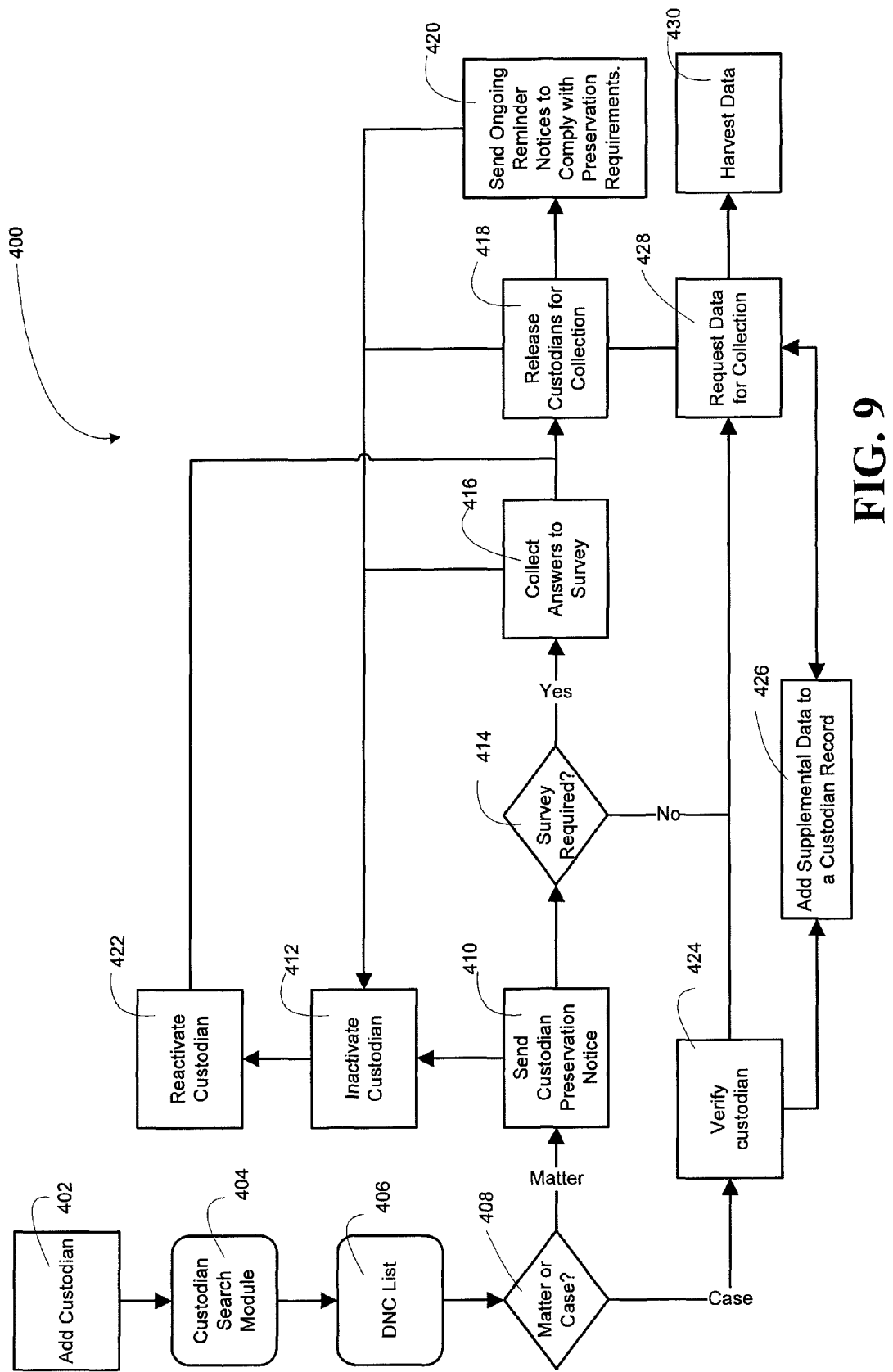
Figure 10:
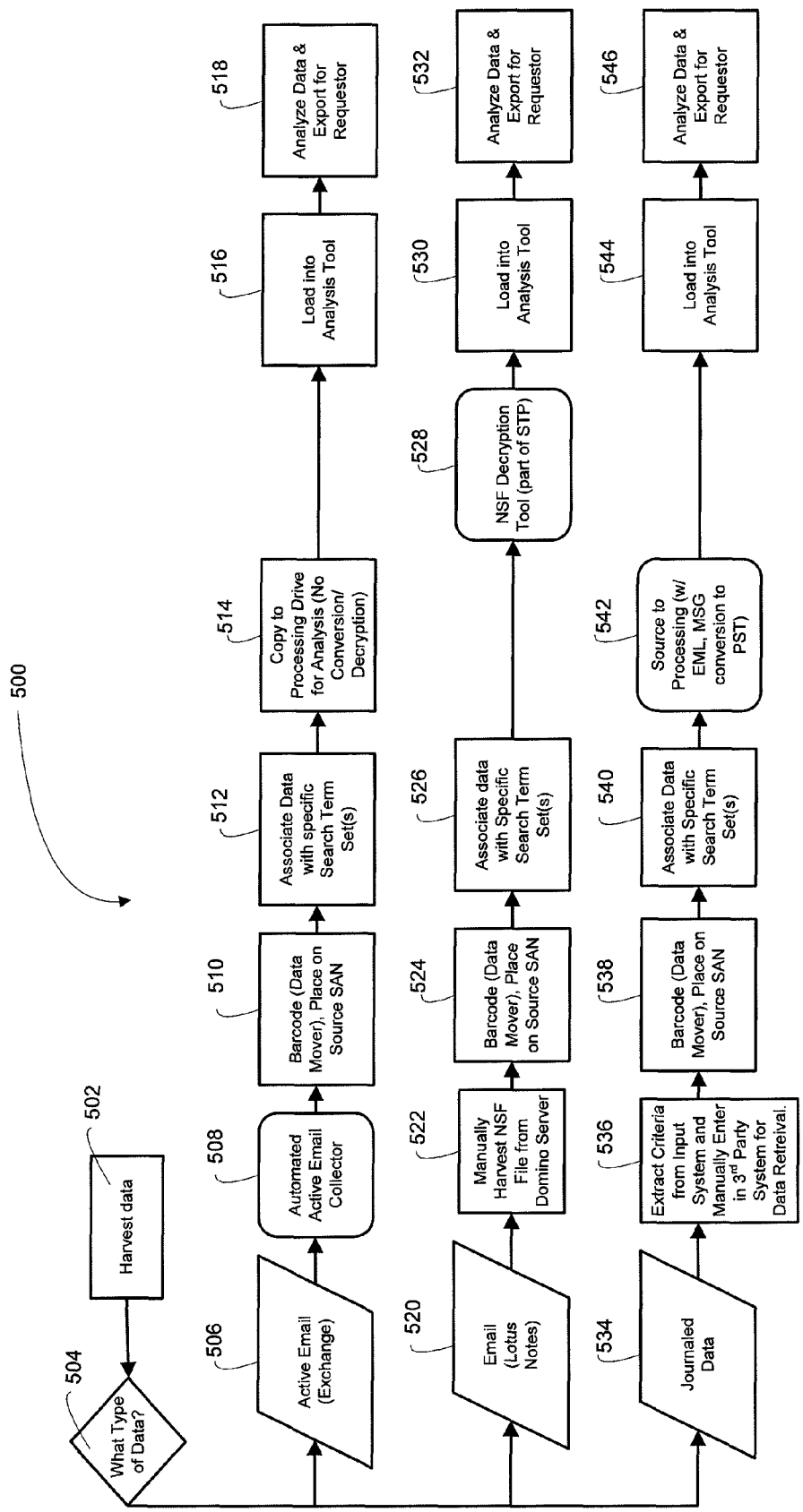
Figure 11:
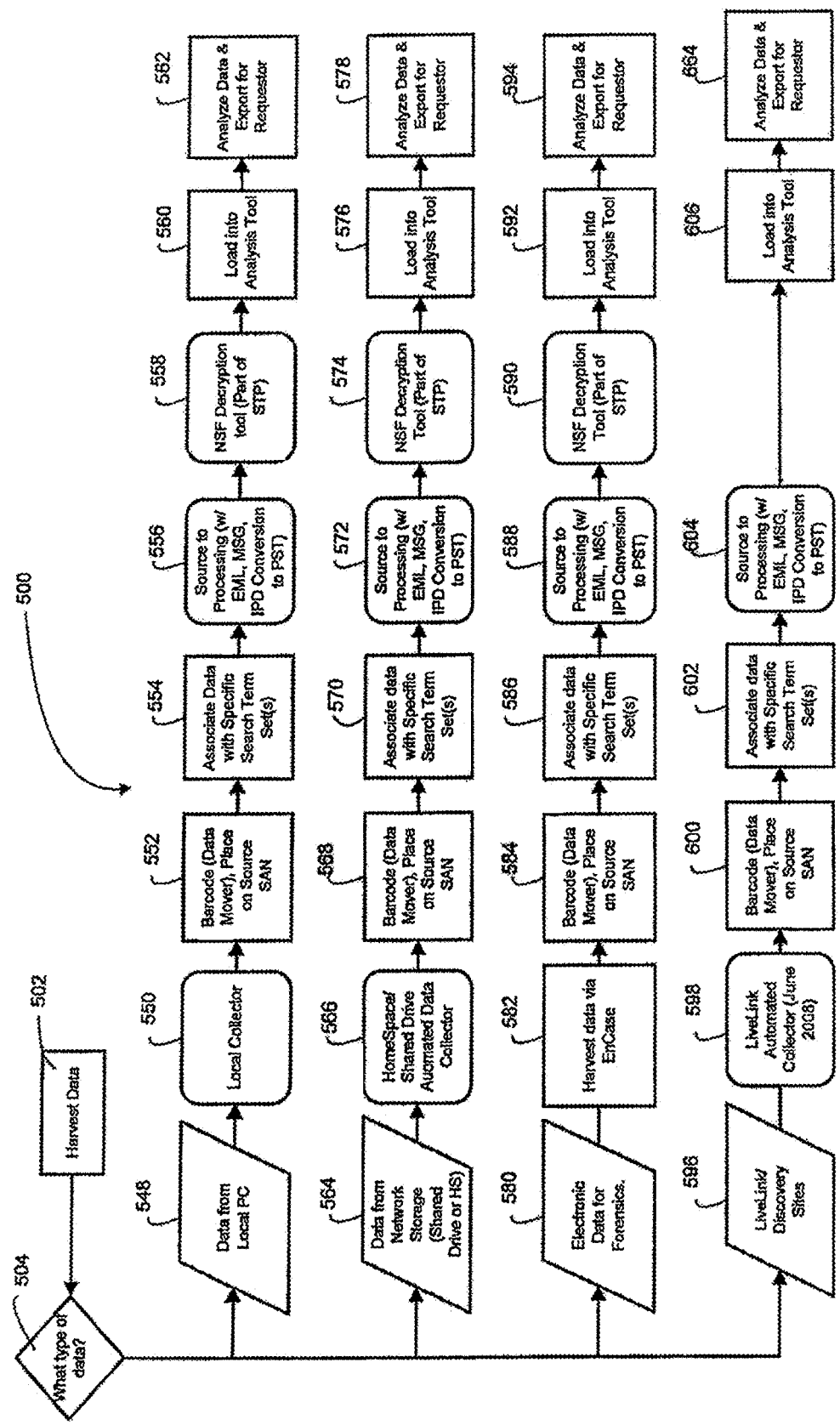

Having thus described embodiments of the invention in general terms, reference may now be made to the accompanying drawings:

FIG. 1 illustrates a network environment in which the processes described herein are implemented, according to one embodiment of the invention;

FIG. 2 is a block diagram of an electronic discovery manager server, in accordance with embodiment of the present invention;

FIG. 3 is a block diagram of a database server, in accordance with an embodiment of the present invention;

FIG. 4 is a block diagram of a collection server, in accordance with an embodiment of the present invention;

FIG. 5 is a block diagram of a custodian management system, in accordance with an embodiment of the invention;

FIG. 6 is a flow diagram of a method for maintaining a custodian database, in accordance with an embodiment of the invention;

FIG. 7 is block diagram illustrating electronic discovery management structure, in accordance with an embodiment of the invention;

FIG. 8 is a flow diagram of a method for initiating a case or matter including creating search terms, creating and sending preservation notices, sending reminder notices and creating and sending surveys to custodians, in accordance with embodiments of the present invention;

FIG. 9 is a flow diagram of a method for custodian management in an electronic discovery system, in accordance with an embodiment of the present invention;

FIGS. 10 and 11 are flow diagrams of methods for harvesting different data types in an electronic discovery system; in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention provide a unique custodian directory and management system that enables an electronic discovery system to manage custodians separately from the cases and data to which they relate. One of the key aspects of the present invention is that it causes the processes implemented by and through the electronic discovery system to be significantly more efficient and scalable than those of the prior art. The custodian management system of the present invention will be discussed in detail below with reference made to FIGS. 5 and 6. First, the environment of the custodian management system, i.e. the enterprise electronic discovery system, and the three major elements of the organizational structure of the electronic discovery system (cases, custodians, and data) should be explained.

There are countless circumstances that may arise within an enterprise or business that require the collection of electronic data from the employees and officers of the enterprise or business. Such circumstances may arise out of ongoing litigation, investigations, regulatory compliance issues, etc. Each time electronic data is required or is potentially required to be collected, the subject matter of the reason for the collection is a "matter," and, eventually, a "case" within the electronic discovery system of the present invention. Within each case, the electronic data that is required will generally have been created by or associated with a particular employee or officer, i.e. a "custodian." Each member of the enterprise or business could be a custodian. Finally, the custodian data that is harvested or collected from various storage locations needs to be available to be readily accessed by those who need it for the case. Thus, there are matters/cases (which will be referred to together as "cases" for convenience), custodians, and data which all need to be identified, established, and managed within the electronic discovery system in order to complete the data collection processes.

Existing electronic discovery systems have generally been structured so that every process and piece of data relating to a collection is stored and managed according to one governing organizational header, such as a particular litigation or a particular collection. In other words, individuals identified for collection as well as the data collected from such individuals are assigned to a collection or the particular case, matter, litigation, investigation, etc. for which the collection was required, and all management activities are performed by working through the organizational hierarchy of that case. However, the unified custodian directory and management system of the present invention enables an electronic discovery system to capitalize on the separate storage of case records, custodian records, and collected data within an electronic discovery system. This novel innovation, combined with strategic linkages between the custodian management directory and those systems housing case records and collected data, allows management of the e-discovery system to be implemented in a unique and extremely efficient manner that is a significant improvement over existing systems.

FIG. 1 illustrates an exemplary electronic discovery system 100 in which embodiments of the custodian management system of the present invention may be implemented. In some embodiments, the environment of the electronic discovery system 100 is the information technology platform of an enterprise, for example a national or multi-national corporation, and includes a multitude of servers, machines, and network storage devices in communication with one another over a communication network. In particular, an electronic discovery management server 110, at least one database server 120, a collections server 130, enterprise personal computers 140, enterprise file servers 150, including at least one personal network storage area and at least one shared network storage area, enterprise email servers 160, a conversion services server 170, a short-term staging drive 180, and a long-term network storage network 190 are all in communication over a communication network 102. The communication network 102 may be a wide area network, including the Internet, a local area network or intranet, a wireless network, or the like.

As shown in the block diagram of FIG. 2, the electronic discovery management server 110 provides user interface management for a user via user interface 118. In some embodiments, the electronic discovery management server 110 is a web server that can be accessed via a web browser. In one particular embodiment, the electronic discovery management server 110 is an intranet website server that may be accessed utilizing a web browser on a machine within the enterprise. Through the electronic discovery management server 110, the user interface 118 may be presented to a user for the purposes of managing the electronic discovery process and all processes described herein that are inherent thereto. For illustrative purposes, it may be assumed herein that the primary user interacting with the user interface 118 is an employee or contractor of the company who serves an electronic discovery management role, and hereafter is referred to as the "e-discovery manager." As discussed in greater detail below, the e-discovery manager may utilize the user interface 118 to manage cases, custodians, collections, and collected data. It should be appreciated, however, that any individual could use the user interface 118 to perform the manual functions herein attributed to the e-discovery manager, and, indeed, that an automated process could perform those functions as well.

Referring again to FIG. 1, the electronic discovery management server 110 is in communication with the database server 120 and the collections server 130 via the communication network 102. The database server 120, as shown in the block diagram of FIG. 3, is configured to provide database services for the electronic discovery management server 110, including housing the Unified Directory/custodian database 122, which includes data relating to individual custodians, the case database 124, which includes data relating to particular cases, and ongoing collections database 126, which includes data relating to collections being undertaken by the collections server 130. Each of the foregoing databases within the database server 120 is discussed in detail below. It should be understood that multiple database servers could be employed instead of a single database server, and reference to a single database server is for illustrative and convenience purposes only. For example, the Unified Directory 122 could be stored in one database server, the case database 124 could be stored in another database server, and the ongoing collections data 126 could be stored in yet another database server.

Regardless of the number of database servers employed, it is an object of embodiments of the electronic discovery system 100 that data relating to custodians and data relating to cases be stored in the database server 120 independently such that custodians and cases may be managed separately. While custodian data in the Unified Directory 122 and case data in the case database 124 may be linked or correlated within the database server 120, by allowing the data to be stored and managed separately in the database server 120, embodiments of the present invention advantageously foster greater efficiency in the management processes of an enterprise electronic discovery environment. For example, in an environment where custodians may be assigned to multiple cases, the effort associated with the collection of data from custodians is greatly reduced because the data relating to the custodian's storage locations does not need to be generated on a case-by-case basis or reproduced in each case record and because, in some situations, data may only be collected once from a particular custodian but used in multiple cases.

When a case is initialized and a custodian is assigned to the case (because the custodian was identified as a subject for electronic discovery within that case), the custodian management system of the present invention enables information for that custodian such as network identifications, human resources information, and other data relating to data storage locations, to be readily and automatically accessed by the electronic discovery management server 110 and linked to the particular case record in the case directory 124, rather than manually input by the e-discovery manager into the case. This is accomplished through the electronic discovery management server 110 interfacing with the Unified Directory 122 in the database server 120. Thus, in the event the same custodian will be the subject of an electronic discovery request in multiple cases, and therefore will be assigned to multiple cases, by having the data relating to that custodian stored in a separate storage location, i.e. the Unified Directory 122, and linked to the multiple case records in the case directory 124, the e-discovery manager avoids having to re-generate and re-enter identical information about the same custodian into multiple case records.

Furthermore, in addition to allowing for management of custodians apart from cases, embodiments of the present invention also provide for management of collected data. Referring to FIG. 4, the collections server 130 is configured to operate a number of tools, including the local collection tool 132, the file server collection tool 134, and the active email collection tool 136 in order to collect different types of data and store such data such that the data may be managed apart from cases. In this regard, in certain embodiments, the data collected from a particular custodian is stored separately from both the custodian information and any relevant case information (as discussed below, the collected data is stored in long-term storage area network 190), but is linked to a custodian, which is in turn linked to one or more cases. This is advantageous because in the event a particular custodian is assigned to multiple cases, data collected from the custodian may be shared with the other case(s) to which the custodian is assigned, which reduces the likelihood of the inefficiencies associated with over-collection. The foregoing are only two examples of the advantages brought about by the unique structure of the present invention; indeed, the separation of cases, custodians and collected data such that they may be linked together yet managed separately greatly improves the efficiency of countless processes crucial to the operation of an electronic discovery system within the environment of an enterprise or any environment with multiple custodians and multiple cases.

Thus, the various processes and components of the electronic discovery system 100 may be primarily categorized within one of case management, custodian management, or data management, although there are necessarily links between the various data stores (case, custodian, collected data) to streamline each process and ensure that each case record is complete. The particular processes and components that may be incorporated into embodiments of the present invention will now be fully explained within the context of the particular unit of work within which they primarily fall, whether it is custodian management, case management, or data management.

Custodian Management

With regard to custodian management, referring now to FIG. 5, according to some embodiments of the present invention, a custodian management system 125 is provided. As shown in FIG. 5, in some embodiments, the custodian management system 125 comprises the electronic discovery management server 110, the Unified Directory 122 (housed within the database server 120), and the human resources systems 127 and information technology systems 129 of the enterprise.

In some embodiments, the Unified Directory/custodian database 122 houses information relating to all potential custodians within the enterprise and the locations where those custodians store data. The information housed in the Unified Directory 122 may include for a particular custodian, for example, the custodian's name, position, human resources identifier (a unique number for each employee of the enterprise), employment location, domain, email addresses, network user identification, personal computer(s) name, paths of network storage devices used by the custodian, including shared drives and HomeSpaces, work history, related persons (such as managers, team members or subordinates), and any other information that may be relevant to the discovery process, including a historical record of the foregoing. Since the human resources identifier (perhaps a social security number) is always unique for each custodian, in some embodiments, the Unified Directory 122 may be organized around the human resources identifier. According to some embodiments, the Unified Directory 122 is generated through a multi-step process that utilizes multiple tools and methods of identifying relevant information relating to custodians and the locations in which they store data. In some embodiments, the Unified Directory 122 is a dynamic directory that interfaces with various data sources such that custodian data is constantly or periodically fed to the Unified Directory 122 for storage. In such embodiments, the electronic discovery management server 110 may be configured to operate and maintain the various data feeds to the Unified Directory 122.

In some embodiments, the Unified Directory 122 is a network of tables or databases that are linked together and organized around the custodians' human resources identifier, social security number, or other unique identifier. In such embodiments, the Unified Directory 122 is not a single database that houses all of the data that relates to the custodian, but rather a network of linked tables, where each table may contain certain data relating to the custodian, such as a table containing network identifications and email account information of custodians or a table containing particular human resources information. Referring again to FIG. 5, the custodian data tables 123, according to some embodiments are tables of data regarding the custodians that are obtained from various sources, whether copied from the HR Systems 125 or the IT systems 129 or generated from tools initiated by the electronic discovery management server 110. The electronic discovery management server 110 is configured to make the linkages between these separately stored tables using the custodians' unique identifiers. Separately storing the tables and providing linkages advantageously avoids the loss or corruption of data that can result from attempting to merge tables. However, in some instances, certain pre-existing tables originating from distinct sources or tables generated from distinct data feeds within the enterprise may be merged if the circumstances indicate that loss of data is unlikely, for example, if the fields of the table match.

Thus, in some embodiments, the electronic discovery management server 110 or the database server 120 is configured to interface with a number of different data sources that contain information relating to the custodians and generate an integrated directory by linking the tables resulting from such sources, i.e. the data tables 123, and associating the data provided therein with unique custodian identifiers. Each custodian's "entry" in the Unified Directory 122 may be generated by accessing the data in each table within the Unified Directory 122 associated with such custodian's unique identifier and compiling the data to obtain a complete report of all data relating to the custodian. In some embodiments, a primary source of data will be the computer databases of the human resources computer systems 125 of the enterprise. The tables and/or data from the tables may be simply copied from the human resources databases into the data tables 123 of the Unified Directory 122 and periodically updated, or, in some embodiments, the tables and databases of the human resources systems 125 may instead be accessed by the electronic discovery management server 110 such that a dynamic interface is created and the databases themselves, although remaining within the human resources systems 125, are now within the scope of the Unified Directory 122 and considered to be the data tables 123. In still other embodiments, the data may be copied from the human resources systems 125 into the Unified Directory 122 to create data tables 123 as a primary step in creating the Unified Directory 122, and the electronic discovery management server 110 may establish a dynamic interface between the Unified Directory 122 and the databases of the human resources systems 125 such that when changes are made to the databases of the human resources systems 125, such changes are automatically logged in the Unified Directory 122 as well.

In some embodiments, the electronic discovery management server 110 may utilize human resources tables and databases originating from the human resources systems 125 as a primary feed of data that can be linked with other tables containing data about the custodians obtained from different sources. The human resources databases may be particularly useful as they can provide information such as name, social security number, human resources identifier, primary email address, work address, home address, employment status, job title, supervisor information, job history, etc. In sum, the human resources databases (or an analogous database) may provide much of the basic information concerning the custodians. As for other data sources that may be utilized to form the Unified Directory 122, in some embodiments, the electronic discovery management server 110 may also interface via the network 102 with the information technology systems 129 of the enterprise in order to obtain databases and directories relating to the custodians' network presence and usage.

The manner in which the data from the IT systems 129 is integrated into the Unified Directory 122, may vary in the same way as described above with regard to the human resources data. Thus the information technology tables may be copied, accessed, or copied and then updated through continuous or periodic access. All of these functions may be performed by the electronic discovery management server 110. In some embodiments, the electronic discovery management server 110 may reach out to network directories and other databases within the IT systems 129, such as Windows Active Directory, to identify network resources related to particular custodians, including email accounts and file servers. The data from the HR systems 125 and the IT systems 129, whether it is merely accessed through a dynamic interface by the electronic discovery management server 110 or copied into the Unified Directory 122 by the electronic discovery management server results in a number of distinct tables containing various data associated with the custodians of the enterprise. The tables are linked together and organized around the human resources identifier such that each custodian entry is associated with one human resources identifier and contains all the data throughout the data tables 123 that is associated with that human resources identifier.

Furthermore, in addition to retrieving information in the manners described above, in some embodiments, information in the Unified Directory 122 is generated through tools initialized and/or deployed by the electronic discovery management server 110. In particular, in some embodiments, as shown in FIG. 2, a profile scanning tool 112, and a mapping tool 114 are provided.

The profile scanning tool 112 may be deployed by the electronic discovery management server 110 and is configured to crawl the communication network 102, scan each of the enterprise personal computers 140, and transmit to the database server 120 identifying information about each computer, such as computer name and IP address, and a list of all profiles, including demographics information, (or network user identification) associated with each computer. According to different embodiments, the profile scanning tool 112 may be run on the electronic discovery management server 110, the collection server 130, or another server in the communication network 102. In some embodiments, the profile scanning tool 112 is further configured to identify and transmit to the database server 120 the most recent date and time at which a particular profile was logged on to the machine. When information relating to a particular computer is received by the database server 120, the database server 120 uses the profile information, which may include several user identifications, to link the particular computer to the custodians in the Unified Directory 122 associated with those user identifications.

According to some embodiments, the data obtained by the profile scanning tool 112 is stored as one or more tables in the data tables 123 of the Unified Directory 122. The electronic discovery management server 110 or the database server 120 is configured to review the data transmitted by the profile scanning tool 112, which may comprise computer names, IP addresses, and network user identifications, and compare the data received with the data in the other data tables 123, for example, the tables obtained from the human resources systems 125 and information technology systems 125 in order to identify matches (most likely by matching the user identification) and make linkages between the tables 123, which will cause the addition of the profile scanning data to the custodian entries. Therefore, by comparing the tables generated by the profile scanning tool 112 with the other tables of the Unified Directory 122, the data obtained by the profile scanning tool, i.e. the computer names and IP addresses associated with particular custodians, may be added to the custodian entries in the Unified Directory 122. The computer names and IP addresses may be used for future reference in collections.

The database server 120 may also record in each custodian's entry in the Unified Directory 122 the last time the computer was accessed by the custodian, according to the profile information transmitted by the profile scanning tool 112. In other embodiments, the list obtained by the profile scanning tool 112 may be stored separately from the Unified Directory 122 and accessed only when a particular collection is being undertaken. Thus, the profile scanning tool 112 ultimately generates a list of personal computers used by each custodian, which list may be utilized to populate the custodian entries in the Unified Directory 122, or may be a separate directory to be utilized at the time of collection, or may be stored elsewhere, as long as it is readily accessible to the e-discovery manager when a collection of a custodian's local machine(s) is initialized, as discussed in detail below.

In accordance with some embodiments of the invention, the mapping tool 114 is configured to crawl the communication network 102 and examine the enterprise file servers 150 residing on the communication network 102 to locate and identify the path of any personal network storage area on each server. As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." According to different embodiments, the mapping tool 114 may be run on the electronic discovery management server 110, the collection server 130, or another server in the communication network 102. In some embodiments, the mapping tool 114 is a Windows service that is scheduled to execute through use of Windows Scheduled Task. As the mapping tool 114 crawls the communication network 102, it is configured to examine each file server and transmit to the database server 120 the path of any network storage area within the plurality of servers 134 that it positively identifies as a HomeSpace. In some embodiments, the mapping tool 114 is configured to explore the enterprise file servers 150 by obtaining and reviewing the directories on each server and evaluating the paths of each network storage area therein, including folders and other storage devices and resources.

With regard to identifying a particular network storage area as a HomeSpace, according to some embodiments, the mapping tool 114 is configured to utilize conventional naming techniques for paths in the communication network 102 to identify those paths of network storage areas within the enterprise file servers 150 that include an indicator, based on the conventional naming techniques, that the particular storage areas associated with those paths are accessed and used by only one user, and are therefore HomeSpaces. In accordance with some embodiments of the invention, each user of the communication network 102 is assigned to at least one user identification and those user identifications are the indicators that the mapping tool 114 attempts to locate within paths when identifying HomeSpaces. In such embodiments, it is the convention that the paths of HomeSpaces on the communication network 102 include the user's user identification. On the other hand, paths of shared network storage areas do not include user identifications. Therefore, the mapping tool 114 may explore the directories of each server within the plurality of servers, evaluate each path in turn, and make a determination as to whether or not the path includes a user identification. If it is determined that the path includes the designated indicator, for example, a user identification, the mapping tool 114 is configured to positively identify the particular network storage area identified by that path as a HomeSpace and transmit to the database server 120 the particular user identification and the path of the HomeSpace. When that information is received by the database server 120, the database server 120 uses the user identification to link the particular HomeSpace to the custodian in the Unified Directory 122 associated with that user identification.

In some embodiments, the data obtained by the mapping tool 114 is stored as one or more tables in the tables 123 of the Unified Directory 122. The electronic discovery management server 110 or the database server 120 is configured to review the data obtained by the mapping tool 114, i.e. the HomeSpace paths associated with particular user identification, and compare such data with the data in the other data tables 123, for example, the tables obtained from the human resources systems 125 and information technology systems 125 in order to identify matches (most likely by matching the user identification) and make linkages between the tables 123, which will cause the addition of the profile scanning data to the custodian entries. Therefore, by comparing the tables generated by the mapping tool 114 with the other tables of the Unified Directory 122, the custodian entries in the Unified Directory 122 will now include HomeSpace location information. This information may be used for future reference in collections, including by being automatically accessed by the electronic discovery management server 110 during collection of a particular custodian. In other embodiments, the HomeSpace directory generated by the mapping tool 114 may be stored separately and only utilized or accessed when a particular collection is undertaken. In yet other embodiments, it could be linked to the Unified Directory 122.

In some embodiments, the mapping tool 114 is also configured to recognize and transmit, and the database server 120 is configured to house, an indication of the last time the HomeSpace was accessed by the particular user, for example, the last time any data was read from and/or written to the HomeSpace. Additionally, in some embodiments, the mapping tool 114 is configured to recognize when multiple paths map to the same network storage area. The collection server 130 compares paths for the same user to determine if duplicative entries exist. This advantageously enables avoidance of multiple collections of the same data. Thus, the profile scanning tool 112 ultimately generates a list of HomeSpaces used by each custodian, and this list may be presented to the e-discovery manager when a collection of a custodian's HomeSpaces is initialized, as discussed in detail below.

In addition to storing a list of personal computers and HomeSpaces used by a particular custodian, which lists were generated by the profile scanning tool 112 and the mapping tool 114 respectively, in accordance with some embodiments of the present invention, the database server 120 is also configured to store a list of any shared network storage areas used by the custodian. As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." The user interface 118 is configured to receive a path of a Shared Drive input by the e-discovery manager and store the path in the Unified Directory 122 in relation to one or more custodians' human resources identifier(s). More particularly, in some embodiments, once a particular user of the communication network 102 is chosen for the collection process, the e-discovery manager may undertake to identify the particular shared network resources that that individual is using, and eventually, the paths associated with those shared network resources. This may be accomplished through conversations with the particular individual, by utilizing data returned from the local collection tool 132 executed on collection server 130 (shown in the block diagram of FIG. 4) deployed to the particular user's machine (as discussed in detail below), and/or by utilizing a file browsing tool 116 executed on electronic discovery manager server 110 (as shown in FIG. 2).

According to some embodiments of the present invention, the file browsing tool 116 is configured to be utilized by the e-discovery manager through the user interface 118. The file browsing tool 116 gives the e-discovery manager elevated authority within the communication network 102 to access, in a limited manner, the enterprise file servers 150 within the communication network 102. While the file browsing tool 116 may not allow access to the actual files stored on certain file servers, it allows the e-discovery manager to browse through the directories of the file servers 150, locate files that have been accessed by the custodian, and determine the size of the files. In accordance with some embodiments, the e-discovery manager may initially have a general idea of a particular file server within the enterprise file servers 150 that the custodian has used in the past. For example, the custodian may communicate to the e-discovery manager a particular folder name and/or drive name on which he/she has stored files. Additionally, in some embodiments, the e-discovery manager may have already undertaken a local collection process on the custodian's machine, wherein the local collection tool 132 returned a list of the network resources that the user of that machine has used. In that event, the e-discovery manager may be aware of the particular drive referenced by the user. The e-discovery manager may then employ the file browsing tool 116 to browse out to the particular drive mentioned, scan the folders for any folder having a name resembling that name given by the user, identify any particular files created by and/or accessed by the user, determine the size of such files, and retrieve the path of any folder (or Shared Drive) including data belonging to the user. The retrieved paths of the Shared Drives may then be added, either manually or automatically, to the Unified Directory 122 in the database server 120.

Thus, by means of the profile scanning tool 112, the mapping tool 114, and the file browsing tool 116, the Unified Directory 122 may obtain data regarding the personal computers, HomeSpaces, and Shared Drives associated with the custodians of the enterprise. In terms of organization of the Unified Directory 122, the data generated by the various tools may be stored in separate tables within the data tables 123 of the Unified Directory 122. In particular, inasmuch as the paths of the Shared Drives may be manually added by the e-discovery manager, there may be a separate table for information input to the Unified Directory through the user interface 118. In some embodiments, the electronic discovery management server 110 manages the tables 123 and creates appropriate linkages amongst them, generally based upon matching the network user identification in order to trace the user identification back to the unique human resources identifier. In this manner, according to some embodiments, the Unified Directory 122 may store in connection with one custodian (and in particular in relation to the custodian's human resources identifier) a list of the personal computers, HomeSpaces, and Shared Drives associated with that custodian. Each of these locations is a potential source of data stored by the custodian, and once an investigation or collection of a custodian is initiated, the location information stored in the Unified Directory 122 may be accessed to determine the particular storage locations that need to be addressed during the investigation/collection.

Therefore, according to some embodiments, the location storage information for a particular custodian is generated and stored either in the custodian's entry in the Unified Directory 122 or in another location where it is linked to the entry or otherwise readily accessible when accessing the custodian entry. Once the custodian is assigned to a particular case, the information may be automatically accessed through the Unified Directory 122 (as the custodian entry in the Unified Directory 122 is linked to the case record 124) and used to initiate collection of the custodian's files. This is advantageous and extremely efficient as it allows a completely automated investigation/collection process, rather than relying on the e-discovery manager to manually input the targeted machines and file servers at the time of collection.

It should be noted that the Unified Directory 122 may be regularly or continuously updated as new information is gathered using the tools described herein. More particularly, the electronic discovery management server 110 may be configured to automatically retrieve data from the human resources databases and Active Directory and any other relevant sources, such as information technology directories or lists, as well as deploy the profile scanning tool 112 and the mapping tool 114, at regularly scheduled intervals. Alternatively, rather than periodically retrieving data from the various data sources such as the human resources databases, the system 100 may be configured such that the database server 120 is continuously interfacing with the data sources such that the Unified Directory 122 is updated in real-time as the data within the data sources change. In either instance, each of the feeds of information into the Unified Directory 122 is regularly updated to ensure that the data in the Unified Directory 122 is current.

In some embodiments, the database server 120 is configured such that all historical data relating to a custodian is stored in relation to that custodian's human resources identifier in the Unified Directory 122. Thus, when the feeds of information into the Unified Directory 122 are updated, in the event data relating to the custodian has changed, the database server 120 is configured to store in the Unified Directory 122 the new data and any relevant metadata, including, for example, the time and date of the change, as well as maintain a record of the old data so that it is still a part of the custodian's profile in the Unified Directory 122. For example, in the event the profile scanning tool 114 identifies a new personal computer associated with a custodian and one of the personal computers associated with the custodian previously is no longer identified, the database server 120 is configured to store in the Unified Directory 122 the information for each computer, as well as indications as to when the new computer was first identified and when the old computer was no longer identified. In this way, the custodian profile within the Unified Database 122 may include a history of the personal computers used by the custodian. Such information may be relevant at the time of investigation or collection of the custodian.

One feed of information into the Unified Directory 122 which is particularly relevant to electronic discovery is employment status. According to some embodiments, when the feed of information from the human resources databases to the Unified Directory 122 includes a change as to employment status of a particular custodian, the electronic discovery management server 110 is configured to recognize the change and possibly perform particular functions in response. More specifically, in the event it is recorded in the Unified Directory 122 that the employment status of a particular custodian changes from active to terminated, the electronic discovery management server 110 is configured to determine whether the custodian is assigned to any case or matter, and, if so, to transmit to the designated manager or contact for the case or matter an electronic communication notifying the manager of the terminated status and inquiring as to whether the manager would like the terminated custodian's data collected. In the event the manager responds in the affirmative, the electronic discovery management server 110 is configured to automatically initiate the various collection processes of the present invention. Therefore, the custodian's data may be advantageously collected prior to any destruction or unavailability that could be caused by the termination. Alternatively, in other embodiments, the electronic discovery management server 110 may not communicate with the manager and may automatically initiate collection upon recognizing a change in employment status.

With reference now to FIG. 6, a flow diagram illustrating one embodiment of maintaining the Unified Directory 122 is provided. As represented by Block 601, data is obtained from the human resources systems 125 of the enterprise and stored in the data tables 123. As discussed previously, there may also be an interface whereby the data is not copied and stored, but rather merely accessed. According to Block 602, data is also obtained from the information technology systems 129 of the enterprise and stored in the data tables 123. Next, as shown in Block 603, the paths and addresses of potential custodian storage locations transmitted by the profile scanning tool 112 and the mapping tool 114 and/or located through the use of the file browsing tool 116, are stored in the data tables 123. As shown in Block 604, data stored in the data tables 123 may also include information input by the e-discovery manager, for example, Shared Drive path information. According to Block 605, the electronic discovery management server 110 searches all of the data tables 123 looking for field matches that indicate that data in different tables should be associated with the same custodian, and provides linkages where such matches are located. Also, as represented by Block 606, the electronic discovery management server 110 will organize all of the linked data under a custodian identifier with which the linked data is associated. The custodian identifier is unique within the enterprise and thus this organizational structure generates individual and unique custodian profiles that contain all the data across the data tables 123 that relates to the respective custodians.

As shown in Block 607, the data tables are updated when the data being fed to the tables changes. The electronic discovery management server 110 maintains an active interface between the data tables 123 and the various data sources, i.e. the human resources systems 125, the information technology systems 127, and the profile scanning tool 112 and mapping tool 114, such that those data sources are periodically or continuously feeding data to the data tables. When the data in those data feeds changes from what was previously recorded in the data tables 123, the data tables 123 are updated. Likewise, and as represented by Block 608, when such a change occurs, the electronic discovery management server 110 records the change, including the previous data, and metadata regarding the change, such that a historical record of the data in the data tables is preserved.

Case Management

With regard to case management processes, according to some embodiments, a case may be initialized by the e-discovery manager utilizing the user interface 118. In this regard, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager), custodians, etc. The electronic discovery management server 110 is configured to store this information in the case database 124 in the database server 120. The case database 124 is configured to house this information such that all information relating to a particular matter or case is related within the case database 124 and a user can use the user interface 118 to view a profile of the matter or case including all the information.

Once the matter and/or case has been initialized, the e-discovery manager may add custodians to the matter or case from whom data may be required to be collected. In some embodiments, the electronic discovery management server 110 is configured to add numerous custodians to a single matter or case at one time. In this regard, the e-discovery manager may use the user interface 118 to enter in identifying information about the custodians. The identifying information for each custodian does not have to be of the same type. For example, a name may be entered for one custodian, an email address for another, a network user identification for another, and a human resources identifier for another. The user interface 118 is configured to receive the identifying information in different input areas depending upon the type of identifying information being received. The electronic discovery management server 110 is configured to use the input information to search the Unified Directory 122 in the database server 120 to determine which custodians are associated with the input information. In the case of a human resources identifier being entered, only one custodian in the Unified Directory 122 may be a match. On the other hand, in the case of a name being entered, multiple custodians may be a match.

The electronic discovery management server 110, after searching the Unified Directory 122 with the input identifying information, is configured to present through the user interface 118 a list of all custodians matching the input identifying information. In the event only one match was returned for a particular set of input identifying information, the electronic discovery management server 110 is configured to automatically select the custodian to be added to the case or matter. On the other hand, in the event more than one match was located for a particular set of input identifying information, then the multiple matches may be presented together to the e-discovery manager through the user interface 118 and marked so that the e-discovery manager must review the multiple custodian profiles associated with the matches to determine the correct custodian that should be added to the case or matter. In doing so, the e-discovery manager may consider the other information in the profiles, such as corporate title, work location, associated custodians, etc. Such information can inform the e-discovery manager as to whether the located custodian is the one intended. The e-discovery manager may then select the correct custodian for addition to the case or matter and confirm that all custodians selected may be added to the case or matter.

According to some embodiments, "adding" a custodian to a case or matter involves linking the custodian profile in the Unified Directory 122 to the case or matter in the case database 124. More specifically, the electronic discovery management server 110 is configured to, once a particular custodian is identified to be added to a particular case, enter into the custodian section of the relevant case record within the case database 124 an identification of the custodian, i.e. the custodian's name, and a link to the custodian's profile in the Unified Directory. According to other embodiments, the custodian's profile information is retrieved and copied into the case record by the electronic discovery management server 110. In either instance, when a collection for a particular custodian is initiated in a particular case by the e-discovery manager, the electronic discovery management server 110 will automatically access the custodian profile for the custodian and determine the particular data storage locations that apply to that custodian. Thus, as will be discussed in detail below, in situations in which the custodian has already been added to the case and matter, the e-discovery manager must only select the particular custodian for collection, and the remaining collection process will be automated, because the Unified Directory 122 already houses all of the relevant information to access the custodian's data and the electronic discovery management server 110 is configured to automatically implement the various collection tools. This is a highly advantageous improvement over the systems of the prior art.

According to some embodiments, upon adding custodians to a matter, the electronic discovery management server 110 is configured to initiate the transmission of preservation notices and surveys to the custodians. In this regard, preservation notices and surveys relevant to the particular case or matter are stored in or linked to the case profile in the case database 124. Transmission of the preservation notices and surveys to custodians added to the case may be automated, for example, there may be preset instructions within the case profile that cause the electronic discovery management server 110 to transmit a particular preservation notice and survey at a particular date or time or upon a particular triggering event, such as a custodian being added to the case, or the e-discovery manager may manually cause the preservation notices and surveys to be transmitted. In some embodiments, the electronic discovery management server 110 is configured to transmit the preservation notices and surveys via a standard email function. The surveys may be tied to the preservation notices such that they are transmitted to custodians together, and one survey may be tied to more than one preservation notice. When a custodian responds to a survey, the survey response is received by the electronic discovery management server 110 and stored in relation to the relevant custodian in the case profile in the case database 124. Furthermore, the electronic discovery management server 110 may be configured to store all or a portion of the data received in the survey response in the Unified Directory 122 in the custodian's profile.

According to some embodiments, each transmission of a preservation notice and survey to a custodian, and each corresponding response, is tracked in the relevant case profile in the case database 124. The electronic discovery management server 110 may also be configured to transmit reminder notices if responses to the surveys are not received within a predefined period of time. The electronic discovery management server 110 may also be configured to schedule reminder notices to be sent to custodians to periodically refresh the custodians' memory of their duty to preserve files/documents pertaining to the matter. In some embodiments, once a preservation notice has been sent to a custodian, the electronic discovery management server 110 may undertake to prevent any reimaging or refreshing of the custodian's personal computer(s) by transmitting an alert of the preservation notice to the enterprise's information technology management group. In addition, the survey responses received from custodians serve to inform the collection process. For example, one survey may inquire as to what network storage devices the custodian uses when storing data. The answer that the custodian gives to the survey may inform the addition of Shared Drives to the custodian profile in the Unified Database 122 that may be used later in collection.

According to some embodiments of the present invention, the e-discovery manager may utilize the user interface 118 to add attachments, notes, tasks, and search terms to a case or matter. In some embodiments, the contacts/managers for a case may also access the case profile in the case database 124 using a web browser and may add attachments, notes, tasks, and search terms to be stored therein. Thus, the e-discovery manager may not be the only entity with access to the case and case management tools of the electronic discovery management server 110. The subject matter of the attachments, notes and tasks could be anything relevant to the case or matter. In some embodiments, the tasks are tasks that particular custodians must complete and the electronic discovery management server 110 is configured to transmit a notice to the custodians that that the task needs to be completed, perhaps using standard email functions. With regard to attachments, the e-discovery manager, or the contact/manager of the case, may upload relevant files to be attached to the case profile.

With regard to the search terms, the e-discovery manager or the case contacts or managers may add certain terms to the case profile to be applied when searching the collected data to locate data responsive or relevant to the underlying issues in the case. Storing the search terms within the case profile is advantageous as it creates a record of the searching that is to be undertaken with respect to the data and aids in organization of the data, as discussed further below.

According to some embodiments of the present invention, when a decision is made that it is time to collect from certain custodians in a matter, the e-discovery manager may use the user interface 118 to release the custodians from the matter to the underlying case. This release triggers the commencement of collection of the custodians' data using the various tools of the system and the data storage information housed in the custodians' entries in the Unified Directory 122 and linked to the case record 124. Furthermore, as discussed briefly above and in detail below, from release of the custodians (i.e. selection of those custodians in the matter to be released to the case by the e-discovery manager) to collection and storage of the collected data, the process may be entirely automated. In some embodiments, the electronic discovery management server 110 is configured to allow all custodians assigned to the matter to be released to the case at the same time. In addition, in instances where the e-discovery manager has previously created groups of custodians within the case, the electronic discovery management server 110 is configured to allow a group of custodians to be released from a matter to a case at the same time.

Data Management

Once a custodian has been identified for collection, whether manually by the e-discovery manager or by being released from a matter to a case, the electronic discovery system 100 is configured to automatically collect the custodian's data using the location information stored in the Unified Directory 122. Therefore, the electronic discovery management server 110 accesses the custodian profile of the custodian to be collected in the Unified Directory 122 and determines, from the information stored therein, the different locations of data storage for the particular custodian that must be collected. There are many different locations that the system 100 can address, including personal computers, email accounts, and network storage areas, including Home-Spaces and Shared Drives.

If a custodian profile (for a custodian released for collection) includes at least one personal computer(s) associated with the custodian, then the electronic discovery management server 110 may undertake to collect the files on these machines. Therefore, the electronic discovery management server 110 may retrieve the relevant machine identifying information, such as domain, name, IP address, etc., and may initialize deployment of a local collection tool 132 running on collections server 130 (as shown in FIG. 4).

The local collection tool 132 is configured to be deployed from the collections server 130 or another server within the network 102 to any of the enterprise personal computers 140. Therefore, for a particular custodian, the local collection tool 132 is configured to utilize the machine identifying information supplied by the electronic discovery management server 110 to be deployed to the identified custodian computer. According to one embodiment, the local collection tool 132 is configured to be automatically installed on the target custodian's personal computer. The local collection tool 132 is further configured to generate a snapshot of the data residing on the local storage of the personal computer 140, for example, by using a commercially available tool such as the Volume Shadow Copy Service, store the snapshot in a storage area on the personal computer, and transmit copies of the files included in the snapshot to the collections server 130. By transmitting the data from the snapshot of the data stored on the hard drive of the personal computer, the local collection tool 132 advantageously allows the custodian to continue to use her machine without substantial interference from the local collection tool 132 and even interact with the data stored on the hard drive as the snapshot of the data is being transmitted to the collections server 130.

In addition to the functions described above, the local collection tool 132 may also be configured to transmit to the database server 120 a catalog of the files included in the snapshot to be stored in the ongoing collections database.

This catalog may be referenced by the collections server 130 in order to determine whether collection is complete and to resume interrupted collections at the point of interruption. Additionally, in accordance with some embodiments, the local collection tool 132 is configured to compile and transmit to the electronic discovery management server 110 a list of network resources the user is using, including, for example, network applications and file servers that the user has used or accessed. This list of resources may be stored in the database server 120 in the custodian's profile in the Unified Directory 122. With regard to transmission of the files themselves, according to one embodiment of the invention, the local collection tool 132 is configured to compress, hash, and upload the files included in the snapshot to the collections server 130.

In some embodiments, the electronic discovery management server 110 may utilize a computer watching tool 117 to determine when to attempt a collection from a custodian's machine. The computer watching tool 117 is configured to monitor the network 102 and determine which of the enterprise personal computers 140 are online. Therefore, in the event there is a custodian whose local machine needs to be collected, the computer watching tool 117 is configured to determine when that machine joins the network 102 (i.e., when it appears to the computer watching tool 117) and inform the electronic discovery management server 110 that it should initialize the local collection tool 132 immediately.

If a custodian profile (for a custodian released for collection) includes any paths for HomeSpaces or Shared Drives, then the electronic discovery management server 110 may undertake to collect the files from these file servers by initializing the file server collection tool 134 running on collection server 130 (as shown in FIG. 4). The file server collection tool 134 is configured to access the file server located at the given path, whether the file server is a HomeSpace or a Shared Drive, copy the data residing on the file server, and compress, hash, and transmit the copied data to the collections server 130. The file server collection tool 134 may be programmed with preset instructions that allow it to only copy files meeting certain criteria, for example, files that have certain file extensions. Alternatively, the programmed instructions may prevent the file server collection tool 134 from copying files having certain file extensions or other attributes. Either of the foregoing is advantageous if the e-discovery manager is not interested in copying executable files or source code, for example. In some embodiments, the file server collection tool 134 is also configured to generate a size estimate of the files residing on the targeted file server. In one embodiment, the file server collection tool 134 may automatically begin the collection process (copying and transmitting data) if the size estimate falls below a predetermined threshold. In addition, in some embodiments, the file server collection tool 134 is configured to determine whether a particular folder that it is collecting from a file server includes more than a token amount of nearline files, and, in the event that the folder does include such nearline files, choose to not collect such files so as to avoid overloading the server. Therefore, according to different embodiments, the file server collection tool 134 copies all or a portion of the files residing on a file server located at the path given in the released custodian's profile and transmits them to the collections server 130.

If a custodian profile (for a custodian released for collection) includes an email address for an email account on the enterprise email server 160, then the electronic discovery management server 110 may undertake to collect the files from the enterprise email server 160 by initializing the active email collection tool 136 running on collections server 130 (as shown in FIG. 4). In some embodiments, the active email collection tool 136 is configured to access the particular Microsoft Exchange server within the enterprise email server 160 on which the custodian's account resides (which is known based on the information included in the Unified Directory 122), copy all email located there, including emails deleted by the custodian up to a predetermined period of time prior to the collection, (for example, seven days prior to the collection) and transmit the copied emails to the collections server 130.

Regardless of the storage resource location from which data is being collected, or the particular type of data being collected, the collections server 130 is configured to store the data first (while the collection is still ongoing) in the short-term staging drive 180 until the particular collection is complete, attach a barcode to the set of data resulting from the particular collection, and then copy the data set to the long-term storage area network 190 for permanent storage. In some embodiments, the barcode is generated at the time the collection is initiated by the electronic discovery management server 110 and acts as a folder within which all files obtained through the collection process are placed. Thus, the barcode is stored with the collected data in the long-term storage area network 190 and is used to identify and access the data collected data at a later time. The log file of the barcode could include the time and date of the collection, the name of the requester, the particular file extension types requested, or any other information that would be useful in identifying or referring to the collection.

In some embodiments, the collections server 130 or another server transmits the barcode information to the electronic discovery management server 110 to be stored in the database server 120, for example, in the custodian's profile in the Unified Database 122, in relation to the stored information about the particular collection, whether it was a local collection, an active email collection, a file server collection, etc. In other embodiments, the barcode information, or an actual link to the barcode in the long-term storage area network 190, is stored within the case record 124 and/or the custodian profile in the Unified Directory 122 at the same time that the barcode is generated. In either instance, the barcode can be used for reference by the e-discovery manager by viewing the case record 124 or the custodian profile, as the case may be, at a later date to determine what collections have already occurred in the case or for the particular custodian. This is particularly advantageous in an enterprise environment or any environment in which multiple cases must be managed and custodians can be assigned to multiple cases, because it allows the e-discovery manager to readily locate and access data that was collected previously from a custodian, perhaps for a different case, and use the data, either for discovery purposes or to inform the collection process.

After the data has been copied to the long-term storage area network 190, the collections server 130 compares the hashing of the data in permanent storage to the original data in the staging drive 180 and, if the hashing is identical, purges the data from the staging drive 180. Once the data has entered the long-term storage area network 190, it is not necessarily ready for review. Indeed, it is likely that the data may need to be processed before it is searchable and suitable for review by investigators and attorneys. For example, the files may be encrypted in the form in which they are collected and sent to the long-term storage area network 190. Therefore, according to some embodiments, the data may be copied to the conversion services server 170 where a series of decryption and standardization functions may be applied to it. After the data is decrypted and standardized, it is returned to the long-term storage area network 190 and may remain there to be accessed for review purposes.

With reference now to FIG. 7, a block diagram is provided that illustrates the electronic discovery management structure of the present invention, according to some embodiments. As illustrated in FIG. 7, certain processes described herein may be categorized within one of case management, as represented by Block 200, custodian management, as represented by Block 220, or data management, as represented by Block 240. As described above, the electronic discovery system 100 is arranged such that cases, custodians and data may be managed independent of one another. However, there is still an element of the categorization of processes within the categories that is conceptual, and it should be understood that certain processes may be correctly assigned to more than one category. Therefore, while the architecture of the system 100 allows separate management of custodians, cases, and data, certain processes of the present invention may affect more than one of the foregoing.

The first process that falls within the case management category is creation of a matter or case as a framework for litigation support activities, as shown in Block 202. As described above, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager) etc.

It is noted that custodian information is stored separately from the case information allowing for the same custodian in multiple cases. This provides for the electronic discovery system of the present invention to have scalability, whereby evidence associated with one custodian may be used in multiple cases.

The electronic discovery management server 110 stores this information in the case database 124 in the database server 120. The case database 124 houses this information such that all information relating to a particular matter or case is related within the case database 124 and a user, such as a manager or contact, can use the user interface 118 to view and edit a profile of the matter or case.

The next process within case management is the creation of preservation notices and surveys specific to the matter, as shown in Block 204. In this regard, the e-discovery manager may, through the user interface 118, either generate a new preservation notices or surveys relevant to the particular case or matter to be stored in the case profile in the case database 124 or, alternatively, link a preservation notice or survey already stored in the database server 120 to the case profile of the specific case or matter at issue. Also within case management is the creation of search terms pertinent to the case, as represented by Block 206. As described above, the e-discovery manager or a contact or manager for the case may use the user interface 118 to input individual search terms or search term sets to be applied to the data harvested in the case. In some embodiments, the search terms may be limited to be used with particular custodians and/or with particular harvested data types. The search terms will be saved in the case database 124 so that they may be readily applied to harvested data and used in connection with storing the resulting responsive data.

The processes of entering relevant attachments, notes and updates to a particular case or matter also falls within the case management category, as demonstrated by Blocks 208 and 210. The e-discovery manager or a case contact or manager may use the user interface 118 to upload documents and enter notes and other relevant data, including updates and reminders, to be stored in the case profile of the case in the case database 124. Once these attachments, notes and updates are added, they may be referenced whenever a user views the case profile through the user interface 118. The cost estimation modules of the present invention are also processes that are categorized as case management processes, as shown in Block 212. In this regard, the electronic discovery management server 110 utilizes a cost estimation tool to determine the cost of harvesting and reviewing data, based on a number of factors including, for example, number of custodians, amount of harvested data, data types, etc. Finally, case management also includes a number of tasking and workflow processes that are represented by block 214.

Moving now to custodian management, certain processes falling within the category of custodian management are shown in Block 220. While the processes involving generation of the Unified Directory 122 certainly could be categorized as custodian management, the processes shown in FIG. 7 include those processes involving management of custodians within the scope of a case or matter. In that regard, the first process of custodian management included in FIG. 7 is the addition of custodians to a case or matter, as shown in Block 222. As described above, the e-discovery manager may use the user interface 118 to link a custodian's profile from the Unified Directory 122 to the particular case profile in the case database 124. Thus, the custodian profile and case profile are correlated. The next processes within custodian management is the transmission of preservation notices and surveys to custodians, as shown in Block 224, and the presentation of the surveys to custodians, as shown in Block 226. The electronic discovery management server 110 uses the contact information in the custodian's profile in the Unified Directory 122 to transmit the preservation notice(s) and survey(s) stored in the case profile to the custodian. In some embodiments, a standard email function is used, so that the only information needed from the Unified Directory 122 is the custodian's email address. When the custodian checks her email, the survey will appear as a message therein, and when she opens that message, the survey will be presented to her. The survey may be configured such that when she fills it out, the survey is automatically transmitted back to the database server 120 for storage in the case profile and the custodian's profile.

Also falling within custodian management is the process of releasing custodians from a matter to a case, as shown in Block 228. The e-discovery manager uses the user interface 118 to mark the custodian's profile so that the custodian is now activated for collection of data. This may occur within the case database 124 since the custodian's profile is linked thereto. Once the custodian is released/marked, the electronic discovery management server 110 may access the custodian's profile and initialize collection based on the various data storage locations identified in the profile. Therefore, as represented by Block 230, the electronic discovery management server 110 may automatically determine the data types and locations of data to be harvested by accessing the custodian's profile in the Unified Directory 122. Alternatively, the e-discovery manager may manually make the same determination by accessing and viewing the custodian's profile. Finally, as with case management, custodian management also includes a number of tasking and workflow processes that are represented by Block 232.

The last category is data management, represented by Block 240. One major set of processes within data management are the processes relating to the harvesting of data, as shown in Block 242. These processes include the collection of data from all the different storage areas of a particular custodian, including the custodian's local storage on her personal computer(s), the custodian's network storage areas, the custodian's email, and any other areas, as are described herein. All of the data in the various storage areas is copied and transmitted to the collections server 130, as described in detail for each particular collection tool or process. Upon reaching the collections server 130, data resulting from a particular collection is temporarily stored in the short-term staging drive 180 until the collection is complete, at which point it is stored in the long-term storage area network 190 in association with a specific identifying barcode. The foregoing process is represented by Block 244. The data may require decryption or standardization functions to be applied to it in order for it to be searchable and/or otherwise usable, so the next process that falls within data management is the copying of the data to the conversion services server 170 for analysis and conversion as necessary, as shown in Block 246. Once the data is converted, it is returned to the long-term storage area network 190 to be used in review.

Also falling within data management is the association of particular data sets with particular sets of search terms stored in the case profile of the case database 124. In this regard, certain search terms stored in the case profile are stored with the intention of being applied to certain types of data and/or certain custodian's data. Alternatively, certain search terms may be applied to all data collected for a specific case. In either instance, the electronic discovery management server 110 accesses the case profile, determines the search terms to be applied, and associates the search terms with the barcode of the appropriate data sets in long-term storage. Thus, the search terms will be applied to that data and the results will be generated and presented to reviewers for analysis. Finally, as with the other management categories, data management also includes a number of tasking and workflow processes that are represented by Block 250.

With reference to FIG. 8, an exemplary process for managing a case is provided, in accordance with one embodiment of the present invention. As represented by Block 302, a case or matter is created by the e-discovery manager and stored in the case database 124. Next, custodians are added to the case, as shown in Block 304, by linking the custodian profiles of the Unified Directory 122 to the case profile. Next, as represented by Block 306, the e-discovery manager and/or the case contact or manager adds search terms to be applied to data harvested for the case, including instructions as to applying the search terms to particular data types or custodians. Block 310 represents the determination that must be made as to whether there is a matter or just a case. If there is no matter because preservation notices are not required, for example, for an audit, then the process will move straight to the initialization of data collection. On the other hand, if there is matter, rather than just a case, then the creation of preservation notices is required, as shown in Block 312.

The preservation notice, as shown in Block 314 is transmitted to the custodians added to the matter, perhaps using email. As shown in Block 316, a reminder notice module may be employed. As shown in Block 318, the reminder notice module transmits periodic reminder notices to custodians. The notices may be sent over email and may remind custodians about the preservation notice and/or remind custodians to fill out surveys. With regard to surveys, in the event a survey is required or desired, according to Block 320, a survey is created. The survey may be saved in the case profile in the case database 124. As shown in Block 322, it is possible to enable the survey to be attached to and transmitted with the preservation notices.

Next, as shown in Block 324, the e-discovery manager may release custodians from the matter to the case, which initialized collection of the custodian's data. As shown in Block 326, the e-discovery manager or the electronic discovery management server 122 accesses the custodian profile, determines the data types and location to be collected, and initializes the applicable collection tools to go collect the data. Once the data has been collected and a unique barcode has been assigned to each dataset based on the particular custodian and storage location from which it originated, as shown in Block 328, the search terms previously stored in the case profile may be assigned to the dataset based on the input instructions regarding the search terms. These search terms may be applied to the dataset and the results saved to be presented to reviewers for analysis.

With reference to FIG. 9, an exemplary process for managing a custodian is provided, in accordance with one embodiment of the present invention. First, as represented by Block 402, a custodian is added to a matter or case. In this regard, the custodian's profile in the Unified Directory 122 is linked to the relevant case or matter profile. In order to locate the custodian's profile, a custodian search module may be employed, as shown in Block 404. Therefore, the e-discovery manager may enter any identifying information about the custodian, whether it is the custodian's name, network user identification, email address, etc. The custodian search module will take the input information and search the Unified Directory 122 for a match. If more than one match is obtained, the user interface 118 will present all matches and allow the e-discovery manager to browse the associated profiles to determine the intended custodian. In this way, the correct custodian is identified and the profile of that custodian is linked to the appropriate case or matter.

As represented by Block 406, the electronic discovery management server 110 may determine whether the particular custodian added is a member of the enterprise "do-not-call list." In this regard, there may be an indication in the custodian's profile in the Unified Directory 122 that the particular custodian should not be contacted regarding collections, and an alternative contact should be used, such as an administrative assistant of the custodian. Alternatively, there may be a separate do-not-call list stored in the database server 120 that must be accessed and searched to determine whether or not the custodian appears on that list. In either instance, a determination is made as to whether or not the custodian should be directly contacted, and in the event the custodian should not be directly contacted, the contact information for the custodian's assistant (or other stand-in) should be obtained. This information will be used later for transmitting preservation notices and surveys.

Next, in accordance with Block 408, a determination is made by the electronic discovery management server 110 as to whether the custodian has been added to a matter or a case. If it is a case, then the custodian is verified, as shown in Block 424, supplemental data may be added to the custodian profile in the Unified Directory 122 as required, as shown in Block 426, and then the various collection tools are initialized by the electronic discovery management server 110 for collection of the custodian's data, as shown in Block 428. On the other hand, if it is a matter, then preservation notices are required. Therefore, as shown in Block 410, a preservation notice is sent via email to the custodian or custodian stand-in. As shown in Block 412, the custodian may then be inactivated from the case because, for some reason, data does not need to be collected from the custodian. In the future, when it comes time to collect from the custodian, the custodian will be reactivated, as shown in Block 422.

After a preservation notice is sent, a determination is made by the electronic discovery management server 110 as to whether a survey is required, as shown in Block 414. It should be noted that in alternate embodiments the decision on whether to send a survey may be made prior to sending the preservation notice. In such alternate embodiments, if the survey is required, it may become a component of the preservation notice and, thus, accessed simultaneously by the custodian. If a survey is required, it is transmitted in conjunction with a preservation notice, and the answers are collected by the electronic discovery management server 110 and stored in the database server 120, as shown in Block 416. Reminder notices for the preservation notices and surveys may also be transmitted to the custodian, as shown in Block 420. Next, once it is time to collect data, the custodian is released from the matter to the case, as shown in Block 418, and the various collection tools are initialized by the electronic discovery management server 110 for collection of the custodian's data, as shown in Block 428. In this process, the custodian's profile in the Unified Directory 122 is accessed in order to determine the various locations where the custodian may have stored data. Finally, as shown in Block 430, the custodian's data is collected.

Referring to FIGS. 10 and 11, flow diagrams are presented of a method 500 for harvest data from various data sources, in accordance with embodiments of the present invention. At Event 502, the collection of data ensues and, at Event 504, the type of data is identified. Data Block 506 signifies active email that is collected from an exchange system or the like. At Event 508 the automated active email collection tool is implemented to collect email from identified email address. As previously noted, and in accordance with present embodiments of the invention, if a custodian profile (for a custodian released for collection) includes an email address for an email account on the enterprise email server (160), then the electronic discovery management server (110) may undertake to collect the files from the enterprise email server (160) by initializing the active email collection tool (136) running on collections server (130). In some embodiments, the active email collection tool (136) is configured to access the particular Microsoft Exchange server within the enterprise email server 160 on which the custodian's account resides (which is known based on the information included in the Unified Directory 122), copy all email located there, including emails deleted up to a designated prior period, for example, seven days prior to the collection, and transmit the copied emails to the collections server (130). The email collection tool is also capable of implementing bulk requests and for collecting email on a scheduled basis, such as daily. The email collection tool is additionally capable of being implementing enterprise wide and requires no server identifiers or the like to collect the active email. In this regard, the email collection tool (136) serves to reduce security risk.

At Event 510, a barcoding tool is implemented at a staging location, such as short-term staging drive (180) to attach a barcode to the set of email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180). As such, barcoding is performed without the need to execute the barcoding tool on an exchange server and, as such no human intervention is needed in the barcode process. In accordance with embodiments of the present invention, one barcode may be assigned per custodian, per data type and per event (i.e., case, matter, etc.)

At Event 512, the collected email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 514, the collected and barcoded active email data is copied to a processing drive for subsequent analysis. It should be noted that the nature of email data obviates the need to perform conversion and/or decryption on the data set. At Event 516, the active email data set is loaded into the analysis tool and, at Event 518, the data set is exported to the requestor/reviewer for analysis.

Data Block 520 signifies other non-exchange server based email, such as email accessed through a client-server, collaborative application, such as Lotus Notes® or the like. At Event 522, NSF files or any other file types associated with non-exchange server based email is manually harvested from an enterprise-grade email server having collaborative capabilities, such as a Lotus Domino server or the like.

At Event 522, a barcoding tool is implemented at a staging location, such as short-term staging drive (180) to attach a barcode to the set of non-exchange server email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180).

At Event 526, the collected non-exchange server email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 528, the NSF files or any other file types associated with non-exchange server based email that may be encrypted is decrypted using a decryption tool, in accordance with embodiments of the present invention. The encryption of NSF files occurs at the user level and, therefore only the user has the password necessary for decryption. The decryption tool allows for decryption of the NSF file-type data without the knowledge of the user/encrypter. The decryption tool finds ID files that exist anywhere in the enterprise system, creates a database of the ID files, associates the database with the user/encrypter and subsequently decrypts the data.

At Event 530, the non-exchange server email data set is loaded into the analysis tool and, at Event 532, the data set is exported to the requestor/reviewer for analysis.

Data Block 534 signifies journaled data, such as electronic commerce data stored on a repository for the purpose of regulation, compliance to regulating bodies, such as the Securities and Exchange Commission (SEC) or the like. At Event 536, criteria is extracted from input system and manually entered in a designated third party system for data retrieval.

At Event 538, the barcoding tool is implemented at a staging location, such as short-term staging drive (180) to attach a barcode to the set of journaled data resulting from the particular collection. The barcoded data is then copied and communicated to the long-term storage area network (190) for permanent storage. At Event 540, the collected and barcoded journaled data may be associated with a specific search term set or sets.

At Event 542 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files and the like.

At Event 544, the journaled data set is loaded into the analysis tool and, at Event 546, the journaled data set is exported to the requestor/reviewer for analysis.

Referring to FIG. 11, data block 548 signifies data from a local Personal Computer (PC), such as enterprise PC (140). At Event 550, the local collection tool (132) is implemented to collect data from designated PCs by taking a "snapshot" of the device's hard drive. According to one embodiment of the invention, the local collection tool may be autodeployed thus, obviating the need for any manual entry by the e-discovery manager or the like. In other embodiments of the invention, the local collection tool (132) may be employed to collect data from network storage.

At Event 552, the barcoding tool is implemented at a staging location, such as short-term staging drive (180) to attach a barcode to the set of local PC data resulting from the particular collection. The barcoded data is then copied and communicated to the long-term storage area network (190) for permanent storage. At Event 554, the collected and barcoded local PC data may be associated with a specific search term set or sets.

At Event 556 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 558, the local PC files that may be encrypted are decrypted using a decryption tool, in accordance with embodiments of the present invention. The decryption tool allows for decryption of the PC files data without the knowledge of the user/encrypter. The decryption tool finds ID files that exist anywhere in the enterprise system, creates a database of the ID files, associates the database with the user/encrypter and subsequently decrypts the data.

At Event 560, the local PC data set is loaded into the analysis tool and, at Event 562, the local PC data set is exported to the requestor/reviewer for analysis.

Data block 564 signifies data from network storage, such as a shared drive or HomeSpace. At Event 566, the file server collection tool (134) is implemented to automatically collect data from shared drives and/or HomeSpace. According to one embodiment of the invention, the file server collection tool (134) may be autodeployed thus, obviating the need for any manual entry by the e-discovery manager or the like.

At Event 568, the barcoding tool is implemented at a staging location, such as short-term staging drive (180) to attach a barcode to the set of network storage data resulting from the particular collection. The barcoded data is then copied and communicated to the long-term storage area network (190) for permanent storage. At Event 570, the collected and barcoded network storage data may be associated with a specific search term set or sets.

At Event 572 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 574, the network storage files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 576, the network storage data set is loaded into the analysis tool and, at Event 578, the network storage data set is exported to the requestor/reviewer for analysis.

Data block 580 signifies electronic data for forensics. At Event 582, a forensic collector tool, such as EnCase® may be executed on the devices of interest to collect data. According to one embodiment of the invention, the forensic collector tool may be automatically deployed on the device of interest without the knowledge of the device user. In accordance with another embodiment of the invention, a computer watcher tool may be implemented (not shown in FIG. 11) that watches the network to determine the addition or subtraction of computers to the network based on ID's/IP addresses returned from the network.

At Event 584, the barcoding tool is implemented at a staging location, such as short-term staging drive (180) to attach a barcode to the set of forensic data resulting from the particular collection. The barcoded data is then copied and communicated to the long-term storage area network (190)

for permanent storage. At Event 586, the collected and barcoded forensic data may be associated with a specific search term set or sets.

At Event 588 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 590, the forensic files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 592, the forensic data set is loaded into the analysis tool and, at Event 594, the network storage data set is exported to the requestor/reviewer for analysis.

Data block 596 signifies collaborative data, such as data residing at discovery sites, for example LiveLink® or the like. At Event 598, a discovery site collector tool, such as a LiveLink® collector tool may be executed on the devices of interest to collect data. According to one embodiment of the invention, the discovery site collector preserves at least a portion of the discovery site database in the e-discovery database, including all files and all revisions of the files. In this regard, the discovery site collector tool queries against the database to define what files need to be retrieved, then copies those files based on the result of the query. Metadata pertaining to the files is retained in the case management system tables. In accordance with another embodiment of the invention, the discovery site collector tool collects the documents and the related metadata and uses the metadata to automatically rename the files.

At Event 600, the barcoding tool is implemented at a staging location, such as short-term staging drive (180) to attach a barcode to the set of discovery site data resulting from the particular collection. The barcoded data is then copied and communicated to the long-term storage area network (190) for permanent storage. At Event 602, the collected and barcoded discovery site data may be associated with a specific search term set or sets.

At Event 604 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 606, the discovery site data set is loaded into the analysis tool and, at Event 608, the discovery site data set is exported to the requestor/reviewer for analysis.

Thus, present embodiments herein disclosed provide for improvements in electronic discovery. Embodiments herein disclosed provide for an enterprise wide e-discovery system that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A custodian management system for use in conducting electronic discovery within a network comprising:

one or more storage devices comprising a memory and at least one processor in communication with the memory, wherein the memory is configured to store a dynamic custodian directory comprising a plurality of custodian profiles relating to custodians, wherein the plurality of custodian profiles include at least name, employment position, human resources identifier, and computer network storage locations associated with a corresponding custodian, wherein the plurality of custodian profiles further include one or more tables and databases that are linked based on the human resources identifier associated with the corresponding custodian; and an electronic discovery management server in communication with the one or more storage devices via the network, comprising a memory and at least one processor in communication with the memory, wherein the electronic discovery management server comprises at least a profile scanning tool, a mapping tool, and a file browsing tool stored in the memory, wherein the at least one processor is configured to execute a computer-readable program code to:

deploy the profile scanning tool, wherein the profile scanning tool is configured to (1) crawl the network and scan personal computing devices, (2) retrieve at least a computer name and IP address associated with each of the personal computing devices, and (3) retrieve a list of computer user profiles accessing each of the personal computing devices, wherein the list of computer user profiles comprises first user identification;

deploy the mapping tool, wherein the mapping tool is configured to (1) crawl the network and examine file servers, and (2)retrieve from the file servers, paths to personal storage areas in the network, wherein the paths include a second user identification;

access the file servers, via the file browsing tool, to locate files, retrieve size of the files accessed by each of the custodians and retrieve a third user identification associated with each of the files;

generate the dynamic custodian directory comprising the plurality of custodian profiles, wherein generating each custodian profile includes automatically: (1) linking custodian-specific portions of the tables and databases to the custodian profile based on the human resources identifier associated with a custodian, (2) matching one or more paths to the custodian associated with the custodian profile based on the second user identification included in included in a path associated with the custodian, (3) matching one or more of the personal computing devices to the custodian associated with the custodian profile based on the first user identification, (4) matching one or more of the files to the custodian associated with the custodian profile based on the third user identification, and (5) storing in the linked tables and linked databases associated with the custodian profile the matched one or more paths to the personal storage areas, the matched personal computing devices, and the matched one or more files;

continuously monitor the network for updates in data associated with the personal computing devices, the paths to personal network storage areas, and the files;

determine that an update in the data associated with the personal computing devices, the paths to personal network storage areas, or the files has occurred;

automatically record in the plurality of custodian profiles, information related to the update to the linked tables or linked databases to create a historic record, wherein the information comprises metadata associated with the update including time and date of the update, the updated data associated with the personal computing devices, the paths to personal network storage areas, or the files and original data associated with the personal computing devices, the paths to personal network storage areas, or the files prior to the update;

automatically present a notification via an electronic communication channel to a user device associated with a manager associated with the personal computing devices, the paths to personal network storage areas, or the files, wherein the notification comprise the historic record;

receive a response from the user device, via the electronic communication channel wherein the response comprises notes and documents from the manager associated with the personal computing devices, the paths to personal network storage areas, or the files;

apply the notes and documents from the response to the historic record;

receive an electronic discovery request from an electronic discovery manager via a user interface, wherein the electronic discovery request comprises custodian-related information, wherein the electronic discovery request is associated with an electronic discovery case record;

in response to receiving the electronic discovery request, identify a first custodian profile from the plurality of custodian profiles in the dynamic custodian directory, including the custodian-related information;

access the first custodian profile, collecting a first set of data associated with the first custodian profile, and storing the first set of data in the memory; and link the first custodian profile and the first set of data with the electronic discovery case record.

2. The system of claim 1, wherein the electronic discovery management server is further configured to, determine that more than one custodian profiles include the custodian-related information;

prompt the electronic discovery manager, via the user interface, to select the first custodian profile from the more than one custodian profile; and receive a selection of the first custodian profile from the electronic discovery manager.

3. The system of claim 1, wherein the plurality of custodian profiles comprise information relating to shared storage locations in the network associated with the custodians.

4. The system of claim 3, wherein the electronic discovery management server is further configured to initialize tools on a periodic basis to obtain the information relating to shared storage locations.

5. The system of claim 1, wherein the electronic discovery management server is further configured to send preservation notices associated with the electronic discovery case record to a first custodian related to the first custodian profile using an electronic mail (email) addresses stored in the dynamic custodian directory.

6. The system of claim 1, wherein the dynamic custodian directory is further configured to interface with a human resources database.

7. The system of claim 6, wherein the dynamic custodian directory comprises the human resources database.

8. The system of claim 1, wherein the dynamic custodian directory is configured to be updated continuously or periodically.

9. The system of claim 1, wherein the electronic discovery management server is further configured to:

receive electronic discovery case documents from the electronic discovery manager;

in response to receiving the electronic discovery case documents, store the electronic discovery case documents in the memory; and link the electronic discovery case documents with the electronic discovery case.

10. A method for collecting electronic discovery data from custodians and managing a custodian directory, comprising:

maintaining a dynamic custodian directory comprising a plurality of custodian profiles, wherein the plurality of custodian profiles are associated with custodian, wherein each of the plurality of custodian profiles include at least name, employment position, human resources identifier, information relating to a storage location in a computing network associated with a corresponding custodian, and one or more linked tables or linked databases that are linked based on identifiers associated with the corresponding custodian;

deploying a profile scanning tool, wherein the profile scanning tool is configured to (1) crawl a network and scan personal computing devices, (2) retrieve at least a computer name and IP address associated with each of the personal computing devices, and (3) retrieve a list of computer user profiles accessing each of the personal computing devices, wherein the list of computer user profiles comprises first user identification;

deploying a mapping tool, wherein the mapping tool is configured to (1) crawl the network and examine file servers, and (2) retrieve from the file servers, paths to personal storage areas in the network, wherein the paths include a second user identification;

accessing the file servers, via a file browsing tool, to locate files , retrieve size of the files accessed by each of the custodians and retrieve a third user identification associated with each of the files;

generating the dynamic custodian directory comprising the plurality of custodian profiles, wherein generating each custodian profile includes automatically: (1) linking custodian-specific portions of the tables and database to the custodian profile based on the human resources identifier associated with a custodian, (2) matching one or more paths to the custodian associated with the custodian profile based on the second user identification included in included in a path associated with the custodian, (3) matching one or more of the personal computing devices to the custodian associated with the custodian profile based on the first user identification, (4) matching one or more of the files to the custodian associated with the custodian profile based on the third user identification, and (5) storing in the linked tables and liked databases associated with custodian profile, the matched one or more paths to the personal storage areas, the matched personal computing devices, and the matched one or more files;

continuously monitoring the network for updates in data associated with the personal computing devices, the paths to personal network storage areas, and the files;

determining that an update in the data associated with the personal computing devices, the paths to personal network storage areas, or the files has occurred;

automatically recording in the plurality of custodian profiles, information related to the update to the linked tables or linked databases to create a historic record, wherein the information comprises metadata associated with the update including time and date of the update, the updated data associated with the personal computing devices, the paths to personal network storage areas, or the files and original data associated with the personal computing devices, the paths to personal network storage areas, or the files prior to the update;

automatically presenting a notification via an electronic communication channel to a user device associated with a manager associated with the personal computing devices, the paths to personal network storage areas, or the files, wherein the notification comprises the historic record;

receiving a response from the user device, via the electronic communication channel wherein the response comprises notes and documents from the manager associated with the personal computing devices, the paths to personal network storage areas, or the files;

applying the notes and documents from the response to the historic record;

receiving an electronic discovery request from an electronic discovery manager via a user interface, wherein the electronic discovery request comprises custodian-related information, wherein the electronic discovery request is associated with an electronic discovery case record;

in response to receiving the electronic discovery request, identifying a first custodian profile from the plurality of custodian profiles in the dynamic custodian directory, including the custodian-related information;

accessing the first custodian profile, collecting a first set of data associated with the first custodian profile, and storing the first set of data in a memory device; and linking the first custodian profile and the first set of data with the electronic discovery case record.

11. The method of claim 10, wherein maintaining the dynamic custodian directory further comprises maintaining the dynamic custodian directory comprising at least two tables within the computing network.

12. The method of claim 11, wherein maintaining the dynamic custodian directory further comprises maintaining the dynamic custodian directory comprising the at least two tables wherein the tables reside in different locations within the computing network.

13. The method of claim 10, wherein each of the plurality of custodian profiles in the dynamic custodian directory comprises human resources data.

14. The method of claim 10, wherein the dynamic custodian directory is configured to interface with a human resources database residing on the computing network.

15. The method of claim 10, wherein the dynamic custodian directory comprises a human resources table residing on the computing network.

16. The method of claim 10, wherein each of the plurality of custodian profiles in the dynamic custodian directory comprises information relating to a shared storage location.

17. The method of claim 10, wherein the dynamic custodian directory is configured to be updated continuously or periodically.

18. The method of claim 10, further comprising, automatically communicating a preservation notice notices associated with the electronic discovery case record to a first custodian related to the first custodian profile.

19. The method of claim 10, further comprising:
determining that more than one custodian profiles include the custodian-related information;
prompting the electronic discovery manager, via the user interface, to select the first custodian profile from the more than one custodian profiles; and
receiving a selection of the first custodian profile from the electronic discovery manager.

20. The method of claim 10, further comprising:
receiving electronic discovery case documents from the electronic discovery manager,
in response to receiving the electronic discovery case documents, storing the electronic discovery case documents in the memory device; and
linking the electronic discovery case documents with electronic discovery case.

* * * * *